US012702608B2

(12) United States Patent
Adema et al.

(10) Patent No.: US 12,702,608 B2
(45) Date of Patent: Aug. 11, 2026

(54) EMS-PROTECT: PATIENT-BASED REDUCTION OF TRANSMITTING EMERGING CONTAGIONS TENT

(71) Applicants: The Regents of the University of Colorado, a body corporate, Denver, CO (US); Isovac Products, LLC, Romeoville, IL (US)

(72) Inventors: Anne Leigh Adema, Littleton, CO (US); Maria Jane Mandt, Littleton, CO (US); Daniel Paul Connolly, Denver, CO (US); Peter Michael Jenkner, Downers Grove, IL (US); Christopher Ryan Schultz, Downers Grove, IL (US); Isaac Hayden, Lakewood, CO (US)

(73) Assignees: The Regents of the University of Colorado, a body corporate, Denver, CO (US); Isovac Products, LLC, Romeoville, IL (US)

( * ) Notice: Subject to any disclaimer, the term of this patent is extended or adjusted under 35 U.S.C. 154(b) by 546 days.

(21) Appl. No.: 17/624,233

(22) PCT Filed: Sep. 16, 2021

(86) PCT No.: PCT/US2021/050763
§ 371 (c)(1),
(2) Date: Dec. 30, 2021

(87) PCT Pub. No.: WO2022/061047
PCT Pub. Date: Mar. 24, 2022

(65) Prior Publication Data
US 2023/0248600 A1 Aug. 10, 2023

Related U.S. Application Data

(60) Provisional application No. 63/079,017, filed on Sep. 16, 2020.

(51) Int. Cl.
*A61G 10/00* (2006.01)

(52) U.S. Cl.
CPC .................................. *A61G 10/005* (2013.01)

(58) Field of Classification Search
CPC .................................................... A61G 10/005
(Continued)

(56) References Cited

U.S. PATENT DOCUMENTS 2,776,657 A 1/1957 Batson et al.
2,915,074 A * 12/1959 Leon ...................... E04H 15/20
52/2.21
(Continued)

OTHER PUBLICATIONS

International Preliminary Report on Patentability for PCT/US2021/050763 mailed Mar. 30, 2023; 8 pages.
(Continued)

*Primary Examiner* — Sunita Reddy
(74) *Attorney, Agent, or Firm* — Snell & Wilmer, L.L.P.

(57) ABSTRACT

A personal protective equipment (PPE) apparatus for patient donning during medical treatment is disclosed. The apparatus includes a portable frame and cover configured to surround the patient and mitigate the spread of airborne pathogens generated by the patient to the healthcare provider and surrounding environment.

15 Claims, 20 Drawing Sheets

(58) Field of Classification Search
USPC ........................................................ 600/21–22
See application file for complete search history.

(56) References Cited

U.S. PATENT DOCUMENTS

| | | | | |
|---|---|---|---|---|
| 3,678,921 | A * | 7/1972 | Brendgord ........... | A61G 10/005 600/21 |
| 4,885,000 | A | 12/1989 | Hogan | |
| 4,949,714 | A | 8/1990 | Orr | |
| 6,461,290 | B1 * | 10/2002 | Reichman ............ | A61G 10/005 5/6 |
| 7,481,234 | B1 * | 1/2009 | Gustafson ............. | E04H 15/425 135/156 |
| 11,071,671 | B1 * | 7/2021 | Theriault ............. | A61G 7/1025 |
| 2004/0255937 | A1 | 12/2004 | Sun | |
| 2014/0090680 | A1 * | 4/2014 | Reis ....................... | A61G 1/017 135/96 |
| 2016/0136024 | A1 | 5/2016 | Poenisch et al. | |
| 2016/0150837 | A1 * | 6/2016 | Kaforey ............... | A61G 13/121 128/845 |
| 2019/0380901 | A1 | 12/2019 | Breegi | |
| 2020/0179219 | A1 * | 6/2020 | Petersen .............. | A61H 9/0057 |
| 2021/0298979 | A1 * | 9/2021 | Klein ................... | A61G 7/0501 |
| 2021/0307985 | A1 * | 10/2021 | Staab ..................... | A61G 10/02 |
| 2021/0315758 | A1 * | 10/2021 | Bui ........................ | A61G 10/02 |
| 2021/0317679 | A1 * | 10/2021 | Hornick .................. | E04H 15/48 |
| 2021/0322244 | A1 * | 10/2021 | Moore .................... | E04H 15/20 |
| 2021/0330413 | A1 * | 10/2021 | Feeley ................... | A61B 46/23 |
| 2021/0338361 | A1 * | 11/2021 | Majzoub ........... | A61M 16/0488 |
| 2021/0353482 | A1 * | 11/2021 | Bardo .................. | A61G 10/005 |
| 2021/0393368 | A1 * | 12/2021 | Reyes ................... | A61B 90/40 |
| 2022/0001216 | A1 * | 1/2022 | Adams ................. | A61G 10/023 |
| 2023/0233393 | A1 * | 7/2023 | Patmore ................. | A61B 46/20 600/21 |
| 2023/0293260 | A1 * | 9/2023 | Fuzy ...................... | A61B 90/40 600/21 |

OTHER PUBLICATIONS

International Search Report and Written Opinion for PCT/US2021/050763 mailed Dec. 22, 2021; 10 pages.

* cited by examiner

EMS-PROTECT: PATIENT-BASED REDUCTION OF TRANSMITTING EMERGING CONTAGIONS TENT

CROSS-REFERENCE TO RELATED APPLICATIONS

This application is a U.S. national stage entry under 35 U.S.C. § 371 of International Application No. PCT/US2021/050763 filed Sep. 16, 2021, entitled "EMS-PROTECT: PATIENT-BASED REDUCTION OF TRANSMITTING EMERGING CONTAGIONS TENT," which claims priority to, and the benefit of, U.S. Provisional Patent Application Ser. No. 63/079,017, filed on Sep. 16, 2020. Each of the foregoing applications are hereby incorporated by reference in their entirety (except for any subject matter disclaimers or disavowals, and except to the extent of any conflict with the disclosure of the present application, in which case the disclosure of the present application shall control).

FIELD OF INVENTION

The present invention generally relates to a portable barrier device for mitigating exposure of a pathogen from a patient to a provider and the surrounding environment during patient care, and to methods of its use.

BACKGROUND

The SARS-CoV-2 pandemic has profoundly impacted our system of healthcare, exposing gaps in the ability of standard PPE to protect medical professionals. Providing care for a patient with an illness that may be transmitted via direct contact (e.g. via droplets, secretions, blood, etc.) and/or airborne pathogens involves various challenges. Although caregivers ("practitioners") often wear personal protective equipment ("PPE") while administering care to such patients, shortages of PPE and/or improper usage of PPE may increase the risk that such practitioners will be exposed to the airborne pathogens. Additionally, PPE for airborne pathogens may not be compatible with traditional in-flight safety equipment such as flight helmets, oxygen, or night vision goggles. EMS and air-medical critical care transport teams have faced unprecedented transport volumes and deaths coupled with severe reductions in workforce, exacerbated by critical shortages of PPE, and PPE incompatibility with standard flight safety equipment. This has led to dramatically altered standards of patient care, as EMS agencies alter their prehospital system and services to reduce exposure risk and continue 911 response.

Further, the airborne pathogens may contaminant surrounding environment, such as the surrounding walls, components, and surfaces of the room, vehicle, helicopter, aircraft, or avionics where the patient is located. In the hospital, inability to protect medical personnel and workspaces from novel pathogens has delayed routine patient care such as imaging or procedures given contamination risks to procedural space. Conventional viral transmission inhibiting systems and/or exposure mitigation solutions are often large and cost-prohibitive for many applications, especially pre-hospital situations. Therefore, improved solutions to reduce pathogen exposure are desired. Any discussion of problems and solutions set forth in this section has been included in this disclosure solely for the purposes of providing a context for the present disclosure, and should not be taken as an admission that any or all of the discussion was known at the time the invention was made.

SUMMARY

The subject matter of the present disclosure has been developed in response to the present state of the art, and in particular, in response to the problems and needs in the art that have not yet been fully solved by currently available exposure mitigation systems. Accordingly, the present disclosure has been developed to provide a patient-based personal protective equipment apparatus that overcomes many or all of the above-discussed shortcomings in the art, in accordance with various embodiments.

In various embodiments of the disclosure, a patient-based personal protective equipment apparatus comprises a collapsible frame, and a cover detachably coupled to the frame, wherein the collapsible frame is configured to support the cover, and wherein the cover is configured to provide an internal environment surrounding the head and torso of a patient, and to mitigate the spread of an airborne pathogen from the patient to an external environment surrounding the apparatus.

In various embodiments, a portion of the cover is transparent.

In various embodiments, the apparatus is portable.

In various embodiments, the cover comprises a head assembly configured to be positioned proximal to the patient's head, two side panel assemblies configured to be positioned on each side of the patient, a top panel assembly configured to be positioned above the patient, and a base mat assembly configured to be positioned beneath the patient.

In various embodiments, wherein the cover comprises one or more glove ports configured to allow a user to access the internal environment.

In various embodiments, the cover comprises four glove ports, wherein one glove port is located on each of the two side panel assemblies, and two glove ports are located on the head assembly.

In various embodiments, the top panel assembly further comprises a patient blanket assembly, configured to drape the patient distal to the patient's head and torso.

In various embodiments, the patient blanket assembly comprises one or more straps for securing the patient blanket assembly to the patient, wherein the patient blanket assembly is configured to further mitigate the spread of an airborne pathogen from the patient to an external environment surrounding the apparatus.

In various embodiments, the cover comprises a flexible, plastic material.

In various embodiments, the frame comprises a center point hinge assembly, two short legs extending laterally from the center point hinge assembly, two long legs, wherein each long leg is connected to one of the two short legs by an HOB assembly, two upper arms, extending vertically from the center point hinge assembly, and two arch beams, wherein each arch beam is connected to one of the two upper arms by an upper hinge assembly, wherein each long leg connected to one of the two arch beams by a paddle hinge assembly, wherein each paddle hinge assembly comprises a paddle configured to grip a surface on which the apparatus sits.

In various embodiments, the central point hinge assembly, the HOB assemblies, the paddle hinge assemblies, and the upper hinge assemblies are configured to lock the apparatus in a deployed position and collapse the apparatus in a stowed position.

In various embodiments, the cover comprises a filter.

In various embodiments, the cover is disposable after a single use.

In various embodiments, the frame is reusable.

In various embodiments, the apparatus further comprises a blower unit and an inlet hose coupled to the blower unit and the filter, wherein the blower unit is configured to evacuate air contaminated with the pathogen within the cover, through the filter, through the hose, and out of the internal environment.

In various embodiments, the apparatus further comprises a second blower unit configured to provide airflow into the internal environment.

In various embodiments, the unit is operated by a battery.

In various embodiments, the blower unit and filter are configured to produce at least 12 air exchanges per hour.

In various embodiments, all components of the apparatus are CT and MRI compatible.

In various embodiments, the base mat assembly is configured to stabilize the apparatus on the surface.

The forgoing features and elements are described in greater detail below with reference to the accompanying figures, and may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which it will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION

Figure 1:
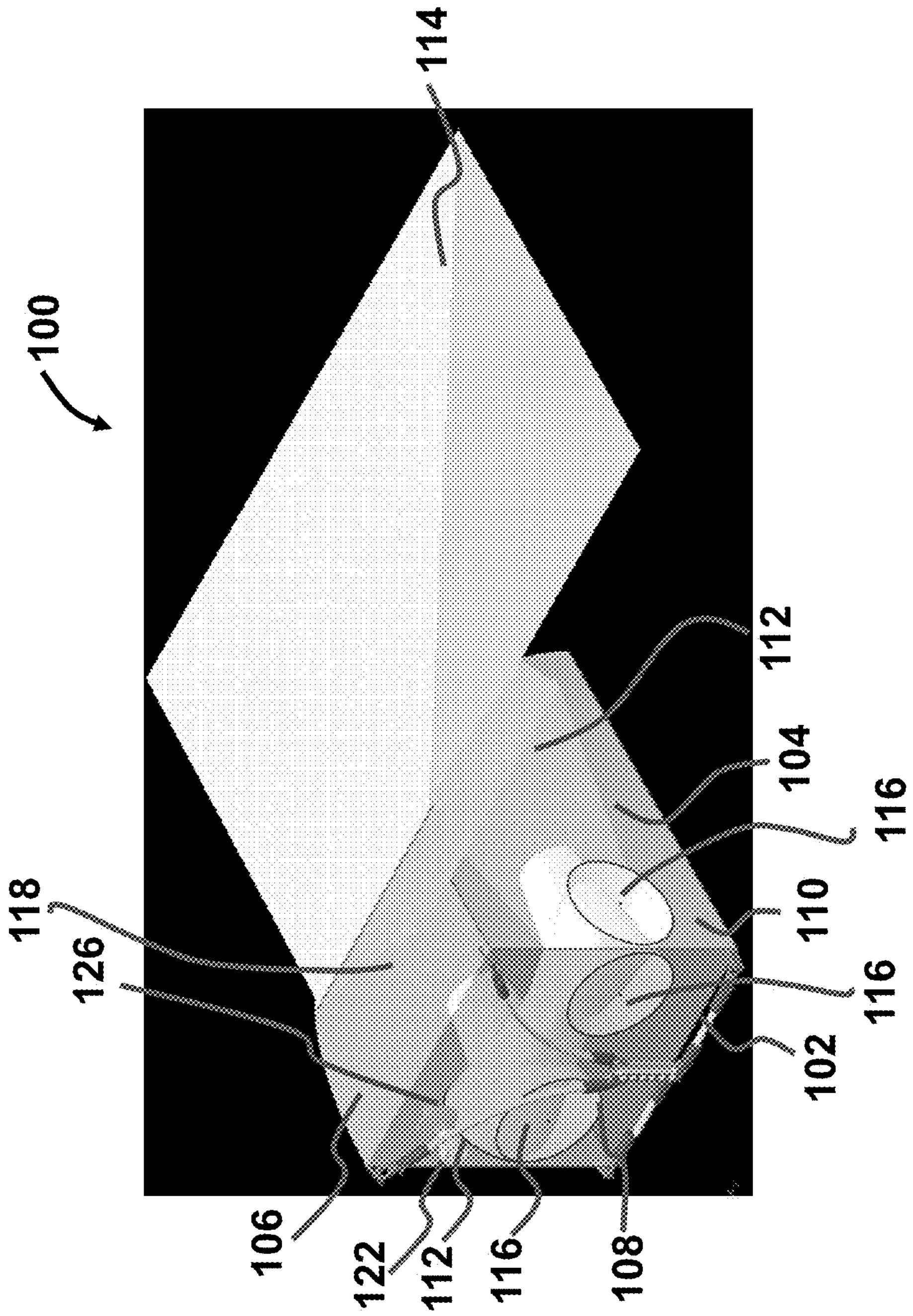
FIGS. 1-6 illustrate a PPE apparatus, in accordance with embodiments of the disclosure.
Figure 2:
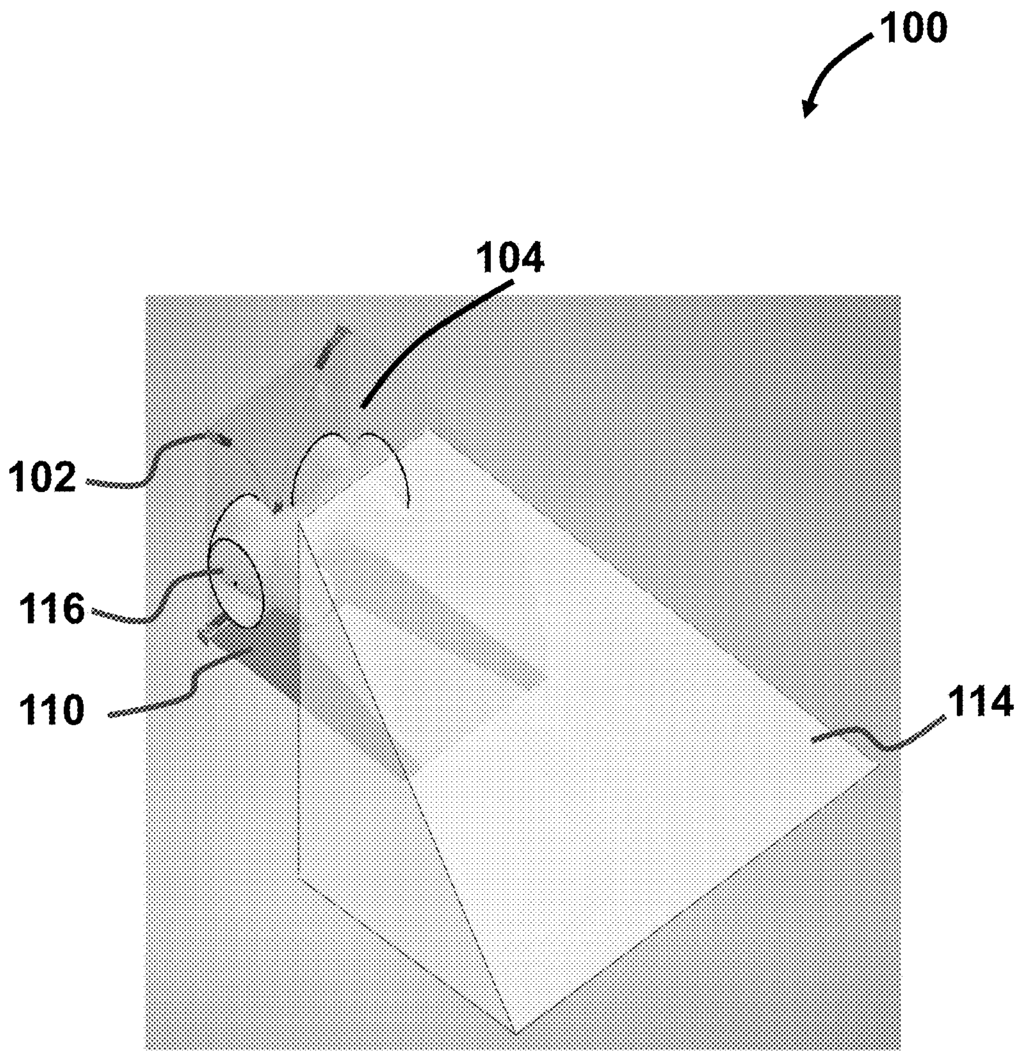
Figure 3:
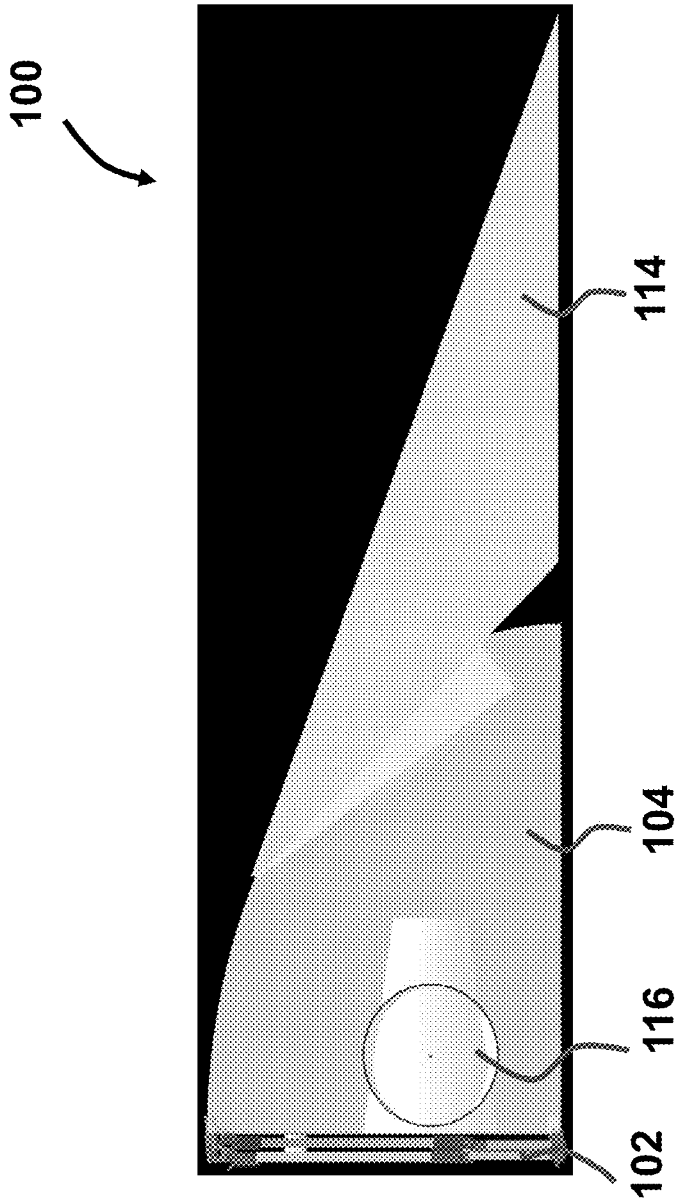
Figure 4:
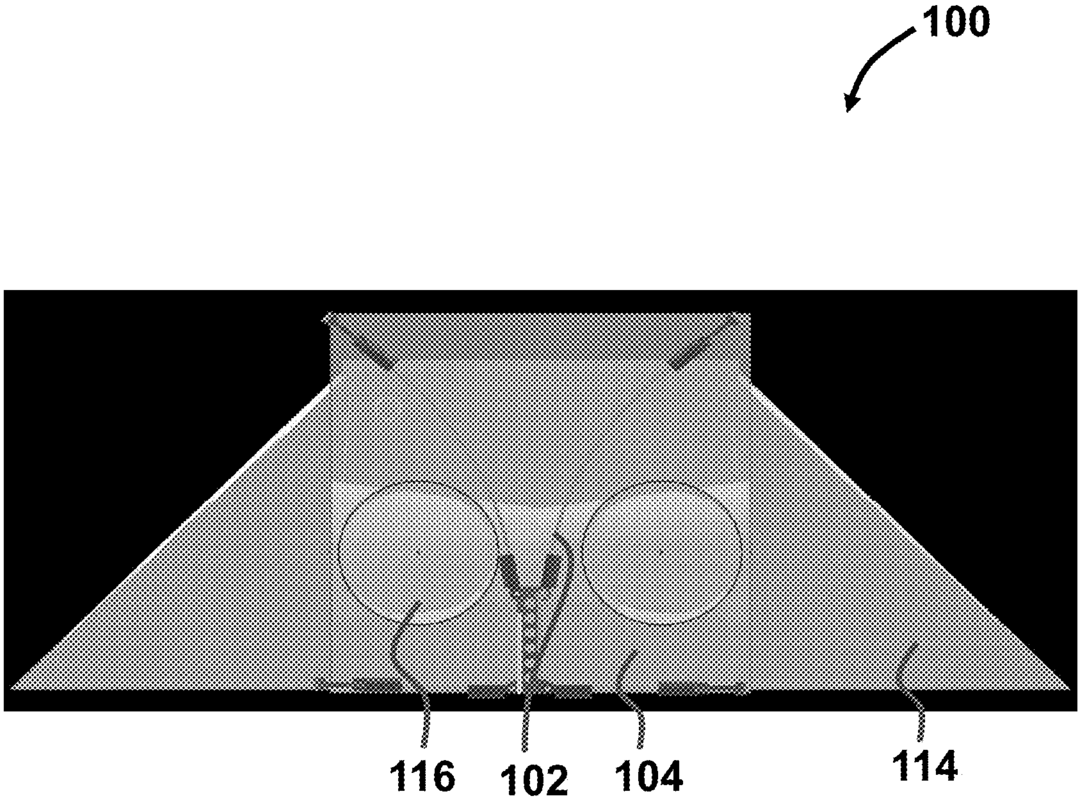
Figure 5:
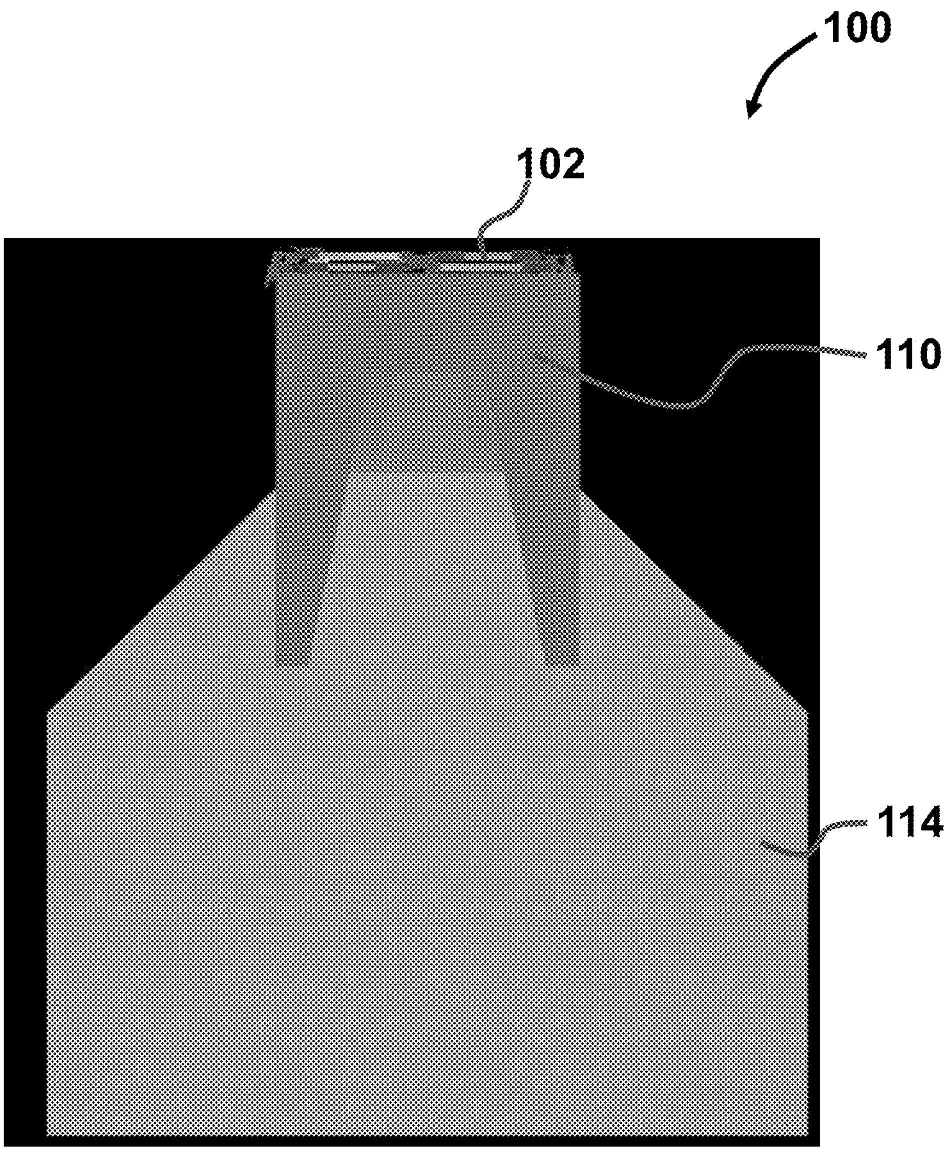
Figure 6:
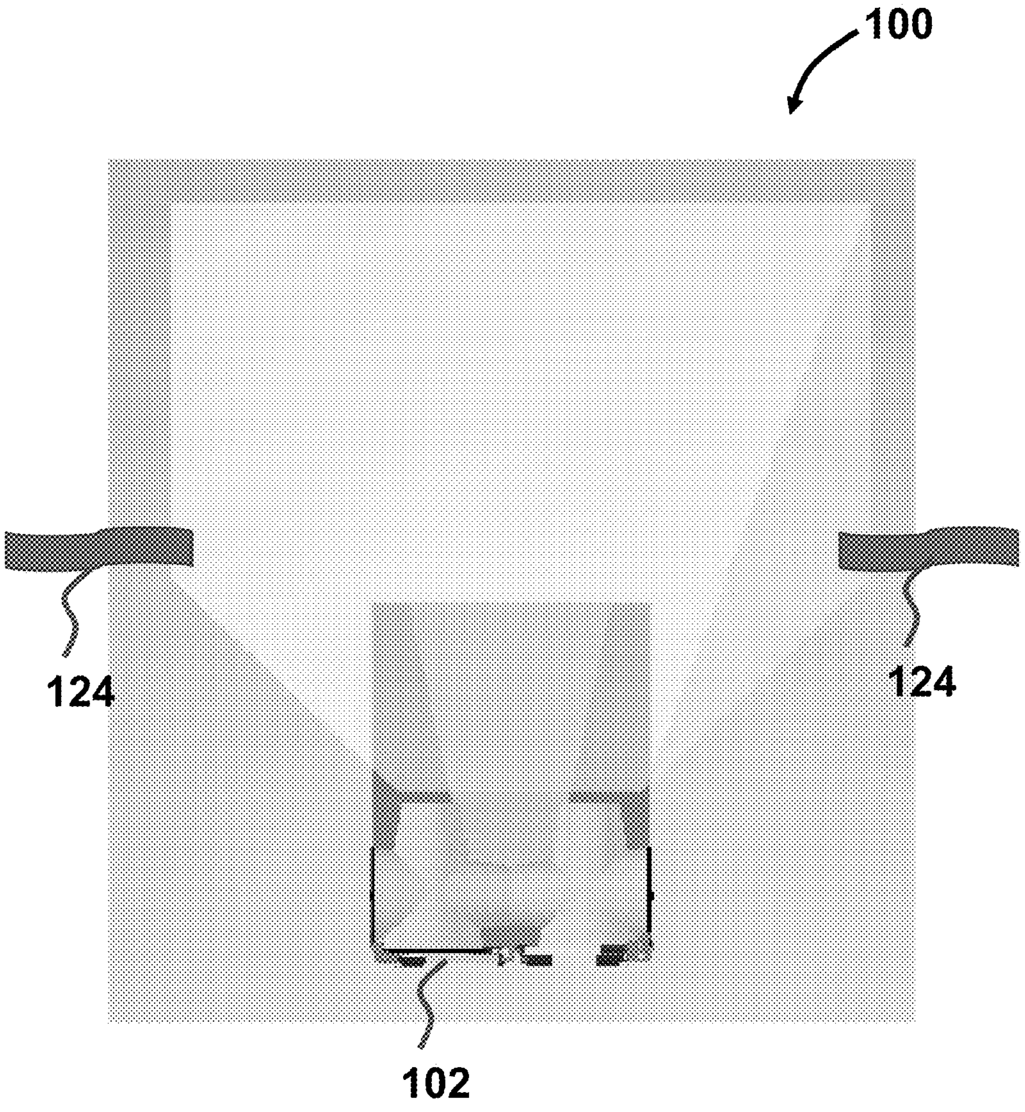
Figure 7:
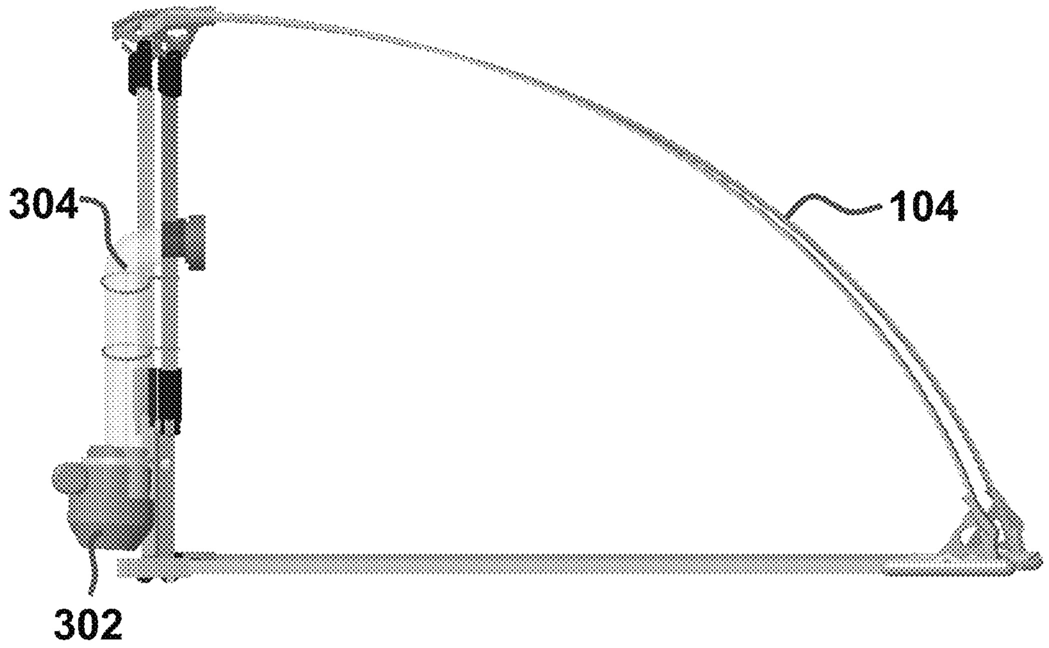
FIGS. 7-11 illustrate a deployed frame, in accordance with embodiments of the disclosure.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Thus, when a particular feature, structure, or characteristic is described in connection with an embodiment, it is submitted that it is within the knowledge of one skilled in the art to affect such feature, structure, or characteristic in connection with other embodiments whether or not explicitly described. Similarly, the use of the term "implementation" means an implementation having a particular feature, structure, or characteristic described in connection with one or more embodiments of the present disclosure. Absent an express correlation to indicate otherwise, an implementation may be associated with one or more embodiments. After reading the description, it will be apparent to one skilled in the relevant art(s) how to implement the disclosure in alternative embodiments.

Disclosed herein, according to various embodiments, is a patient-based personal protective equipment (PPE) apparatus. The PPE apparatus is a pathogen mitigation unit that surrounds the patient's head and torso to create a functional workspace for patient care (infant to large adult). It is composed of a reusable, lightweight frame, airflow introduction system, and a disposable engineered polymer tent with integrated bacterial viral filtering. The device is designed to be compact, rapid to deploy, and provides a physical barrier with excellent patient visibility, to protect frontline medical teams and their clinical workspace (helicopter, fixed wing, ambulance, intra-hospital transport, imaging suites, procedural spaces) from droplet and aerosol exposures. By limiting provider exposure and reducing workspace contamination, the device allows for timely patient care driven by patient needs, rather than altered care protocols to reduce frontline workforce exposures. Integrated textured gloves allow for patient care without repeatedly changing out contaminated PPE. The gloves are ideally textured to help maintain grip on equipment and dexterity regardless of potential patient bodily fluids (e.g. respiratory secretions, vomit, blood).

Because current PPE solutions are incompatible with standard flight safety equipment (helmets, night vision goggles), the PPE apparatus provides a level of protection not currently available to air-medical teams. It is designed to be stowed fully assembled and deployed in <1 minute. All components are CT/MRI compatible.

The PPE apparatus is ideal for moving a patient from the field where PPE is limited or may not accommodate conditions of air-medical transport, to a controlled hospital setting where appropriate PPE and appropriately pressurized rooms are available to care for infectious patients. The apparatus use extends to the intrahospital setting for patient transport through common areas to preserve the environment from contamination without altering ongoing patient management. Intrahospital use benefit extends to more rapid access to radiologic capabilities (CT/MRI) and may decrease decontamination requirements for the utilized environments. The apparatus can be used on a variety of beds (stretcher/gurney/litter/air-medical bed) in the supine to upright position. The apparatus does not rely on an external power source, wall or powered suction device, or supplemental oxygen or airflow from tanks or wall units. It is designed for rapid donning over the patient, and rapid doffing, with emergent doffing capability.

In various embodiments, and with reference to the various figures accompanying this description, the apparatus may generally include a frame and a transparent cover coupled to the frame, as well as an airflow introduction system. The collapsible frame may be configured to support the transparent cover/tent around a patient to reduce the spread of airborne pathogen from the patient. Thus, the patient-based PPE apparatus may provide various benefits, such as protecting providers from droplets and aerosolized particles during aerosol inducing events such as talking, coughing, sneezing, vomiting, intubations, suctioning, administration of nebulized medications, use of non-invasive ventilation apparatuses, or during airway management or resuscitation procedures, while creating a functional pathogen containment space, decreasing workplace exposures by limiting droplet and aerosolized particles to the containment space (i.e., thus decreasing surface and equipment contamination), and/or conserving PPE by limiting personnel exposures and surface contamination. The patient-based PPE apparatus may be referred to herein as a patient-based reduction of transmitting emerging contagions tent (e.g., the "PROTECT" apparatus or the "EMS-PROTECT" apparatus).

Turning to the figures, FIGS. 1-6 illustrate a PPE apparatus 100 including a frame 102 and a cover 104 in a fully deployed position. Cover 104, which also may be referred to as a tent or an internal bag, may be detachably coupled to the frame 102. In preferred embodiments, all of or portions of cover 104 are clear or transparent. In the illustrated embodiment, cover 104 includes a top panel assembly 106, a head assembly 108, a base mat assembly 110, and two side panel assemblies 112. Cover 104, top panel assembly 106, head assembly 108, side panel assemblies 112, and base mat assembly 110 provide an internal environment 118 that mitigates the spread of pathogens from a patient within internal environment 118 to a caregiver treating the patient from outside of the apparatus 100.

Top panel assembly 106 provides a taut, frame-supported section of the PPE apparatus 100 that allows for clear patient visualization. In the illustrated embodiment, top panel assembly 106 includes a patient blanket assembly 114. Patient blanket assembly serves as a functional patient drape to assist in particle containment. In some embodiments, patient blanket assembly 114 is integrated into top panel assembly 106. Patient blanket assembly 114 may include straps 124 that traverse the patient's chest or torso on top of patient blanket assembly 114 if the patient is larger in size, e.g. an adult, thereby further securing patient blanket assembly 114 and mitigating pathogen escape. If the patient is small in size, e.g. a child, or an infant, the straps 124 may traverse a bed, gurney, stretcher, or platform that the patient is resting on at a position distal to the patient. Straps 124 may be located anywhere along the length of patient blanket assembly that mitigates escape of pathogens from the internal environment 118. The straps 124 may include elasticized velcro strappings. However, any securing mechanism may be used, e.g. buckles, ties, elastic etc. When secured, the straps 124 may be loose enough to provide a passthrough port for rapid introduction of equipment into the cover 104, and remain flexible for any necessary patient manipulations, while remaining comfortable and non-constricting across the patient. The patient blanket assembly 114 also extends the length of cover 104 to allow passage of needed equipment into the contaminated patient workspace, without necessitating provider contamination, further reducing the need for additional PPE.

Head assembly 108 may comprise a transparent 2-inch long by 1.25 inch outside diameter (O.D.), 1-inch inner diameter (I.D.) tube 120. A 40 mm connector is inserted into the 1-inch I.D. dimension and secured with a port clamp and all-weather tape. The connector is inserted into the tube via a 28 mm O.D. barbed straight component. In some embodiments, other securing mechanisms are used. The 40 mm connector contains either male or female 40 mm RD 1/7 DIN 3182 threads for blower connection to the tent. The connector threads can be installed facing either the internal or external environment of the tent, or a combination of both.

Cover 104 includes one or more glove ports 116 that provide access to the patient for treatment while apparatus 100 is in use. In preferred embodiments, glove ports 116 include transparent gloves. The gloves may be transparent up to 100%, at least 90%, at least 80%, at least 70% etc. In preferred embodiments, the gloves are ambidextrous. In the illustrated embodiment, cover 104 includes four glove ports 116, two in the head assembly 108, and one in each of the two side panel assemblies 112. The multiple glove ports allow for multiple providers to assist in patient care. The glove port positions are optimized for patient care in a variety of patient care environments such as transport vehicles (ambulance, fixed wing, helicopter), and hospital rooms.

In some embodiments, cover 104 includes one or more glove ports, e.g. one, two, three, four, five, six, etc. Glove ports 116 may be distributed anywhere in cover 104 that provides access to the patient. Glove ports 116 provide for a double glove system such that a provider's own PPE remains uncontaminated during patient care, decreasing overall use of provider PPE, and limiting contamination to the clinical workspace.

Each side panel assembly 112 includes one or more glove ports 116. The two side panel assemblies 112 may mirror each other or include glove ports 116 in positions that do not mirror one another. Side panel assembly 112 is a two-layered assembly including an inner side panel facing the inside of the deployed apparatus 100 and an outer side panel facing outside of the deployed apparatus 100. The inner side panel of the side panel assembly 112 includes a series of integrated pockets (not shown) that provide for seamless installation of frame 102 with cover 104. Side panel assembly 112 and head assembly 108 may include straps for securing cover 104 to frame 102 when frame 102 is fully deployed. In preferred embodiments, the straps are velcro. However, any securing mechanism may be used, e.g. adhesives, laces, bands, tapes, etc.

Base mat assembly 110 is configured to act as a universal net on various stretchers and litters to minimize any fluids and air particles escaping through the bottom of the apparatus 100. In preferred embodiments, base mat assembly 110 is shaped as a rectangle with a trapezoid or trapezoid-like cut out at the chest end or proximal end of the apparatus 100. Due to this shape, base mat assembly 110 covers potential leak points on the bottom of apparatus 100 on any bed/stretcher/litter that apparatus 100 is used on. Base mat assembly 110 is configured to ergonomically fit with the shape of a patient's chest and arms, ensuring that during use, particulates are kept within the internal environment 118 of apparatus 100. In some embodiments, base mat assembly 110 is comprised of a thicker engineered polymer material. However, other materials may be used, such as coated or non-coated PE, PP, polyester, PUR, LDPE, LLDPE, HDPE, PVC, etc. In preferred embodiments, base mat assembly 110 is the most rigid material on cover 104. In preferred embodiments, base mat assembly 110 is made of an opaque colored material, e.g. orange, in high contrast to the rest of the transparent cover 104, allowing for easy identification and location of medical equipment in the internal environment 118 of the cover 104. Despite being the most rigid material, the base mat still lends itself to easy storage when fully assembled and stowed.

Cover 104 may be made from a flexible, plastic material. In preferred embodiments, cover 104 is comprised of an FDA-approved engineered polymer. In preferred embodiments, cover 104 is disposable. Due to the flexibility of cover 104, the PPE apparatus 100 allows healthcare providers the ability to perform various procedures for patient care, including airway management procedures, such as suctioning, using a bag valve mask, applying supplemental oxygen via nasal cannula, heated high flow, CPAP, BIPAP, patient intubation (using direct laryngoscopy or video assisted intubation equipment), nebulized medication administration, and intubated and ventilated patient management; as well as resuscitation efforts including cardiopulmonary resuscitation (CPR), central line placement, arterial and venous access, and chest tube placement.

Figure 8:
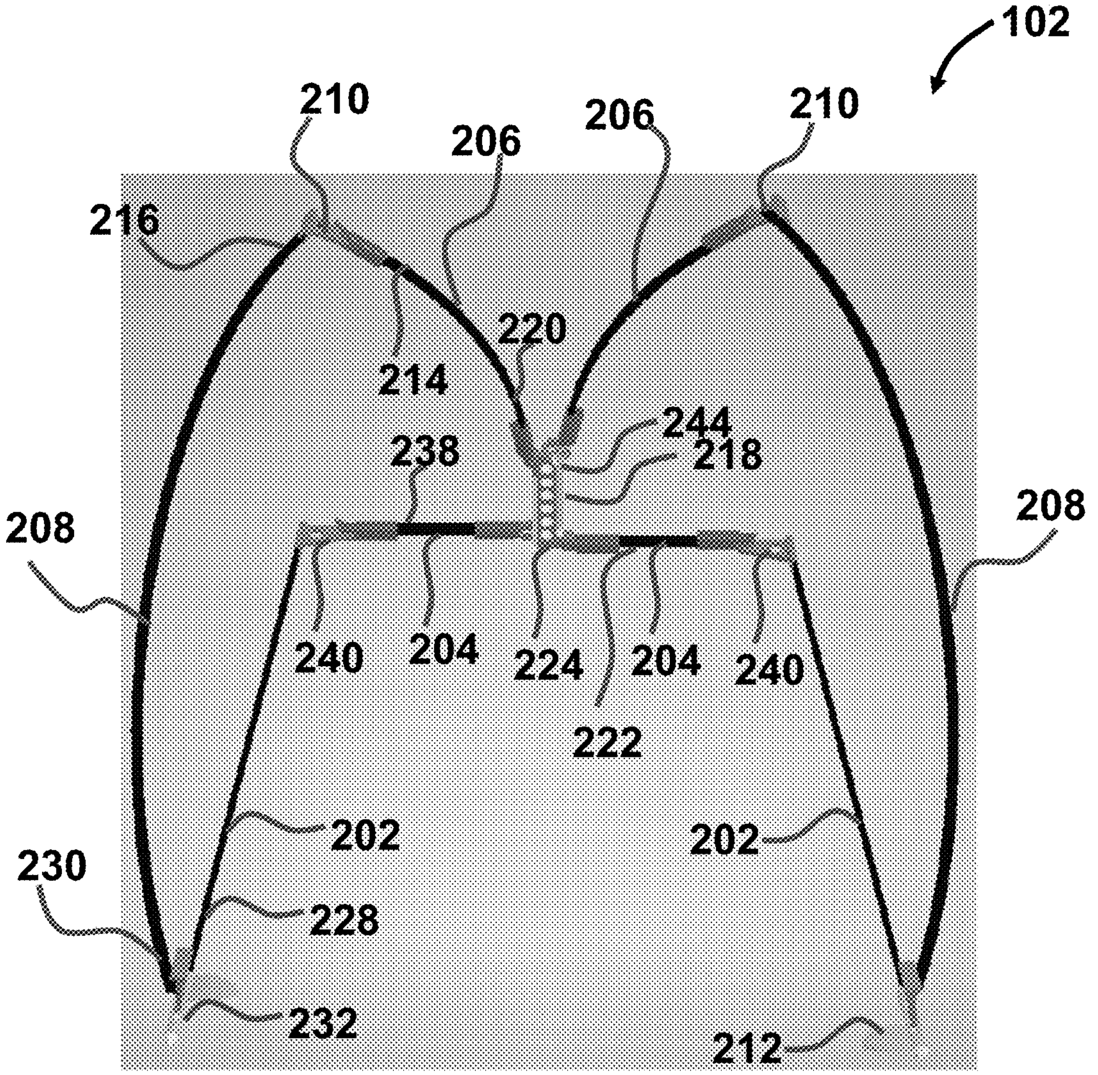
Figure 9:
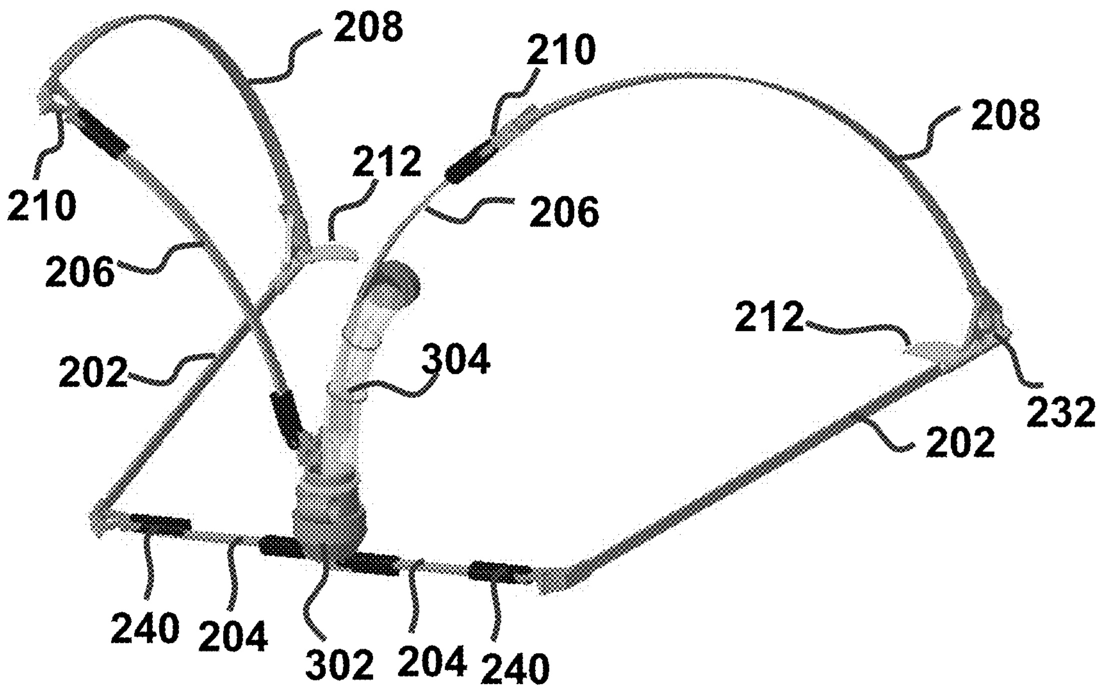
Figure 10:
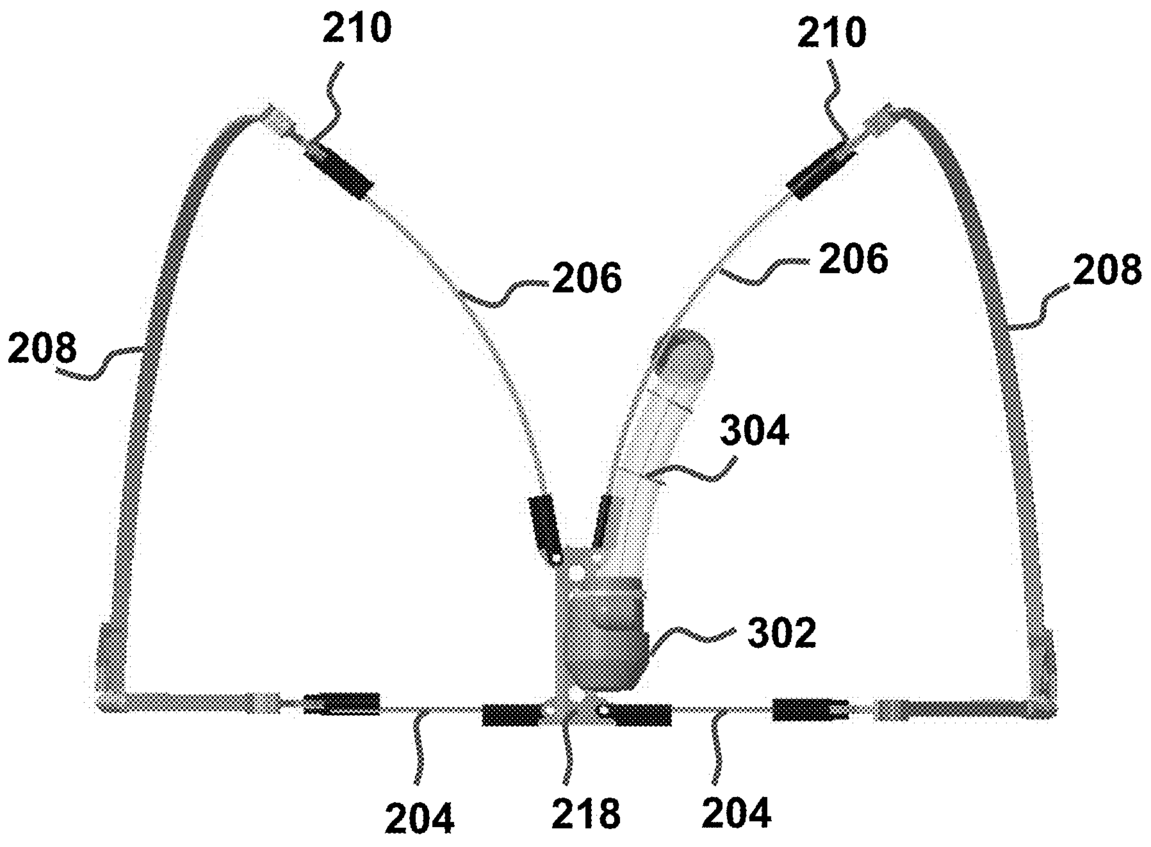

FIGS. 7-11 illustrate frame 102 in a fully deployed position. Frame 102 is configured to be reusable, lightweight, and rapidly deployed and stowed, with a small storage footprint. Frame 102 includes two long legs 202, two short legs 204, two upper arms 206 and two arch beams 208. In preferred embodiments the left and right sides of frame 102 are symmetrical or almost symmetrical when viewed from the distal or proximal end. In preferred embodiments, long legs 202, short legs 204, and upper arms 206, are made of fiberglass, which provides stability and flexibility where needed, while being a practical weight. For example, short legs 204 and long legs 202 may be made of 3⁄16 inch thick fiberglass and arch beams 208 may be made of 1⁄8 inch thick fiberglass. The more rigid 3⁄16 inch thick fiberglass is shatter and puncture resistant, and provides a robust support structure along the base of apparatus 100 that is resistant to bend and deformation, creating a resilient frame capable of reuse and weathering almost any use case. The curve of upper arms 206, as shown in FIGS. 8-10 help improve patient visibility when looking in-line with the patient from the patient's head. The more flexible 1⁄8 inch thick fiberglass used to create the arch beams 208 gives PPE apparatus 100 its desired shape. Reducing the amount of sharp corners within the unit improves unidirectional airflow, preventing carbon dioxide pooling within the internal environment 118. Fiberglass also provides shatter resistance, while still providing desired flexibility. However, other materials may be used, e.g. polycarbonate, acrylic plastic, polystyrene, carbon fiber, etc. In other embodiments, arch beams 208 are made of clear, formed acrylic plastic to provide improved visibility to the internal environment 118 of the PPE apparatus 100. Frame 102 may be gel coated or coated with a similar substance to avoid any splintering or injury. In some embodiments, frame 102 may yield during incremental contact yet rebound into full shape again once outside force is removed. When cover 104 is contacted or pressed against, or glove ports 116 are being used, the frame 102 may yield to prevent cover 104 from being disconnected from frame 102. Frame sections and/or associated hinges, discussed in further detail below, may be color-coordinated to facilitate proper assembly and/or orientation of apparatus 100 relative to the patient.

The transparent cover 104 may also include color-coordinated features to facilitate proper orientation of cover 104 to frame 102 when installing/replacing cover 104.

Figure 12:
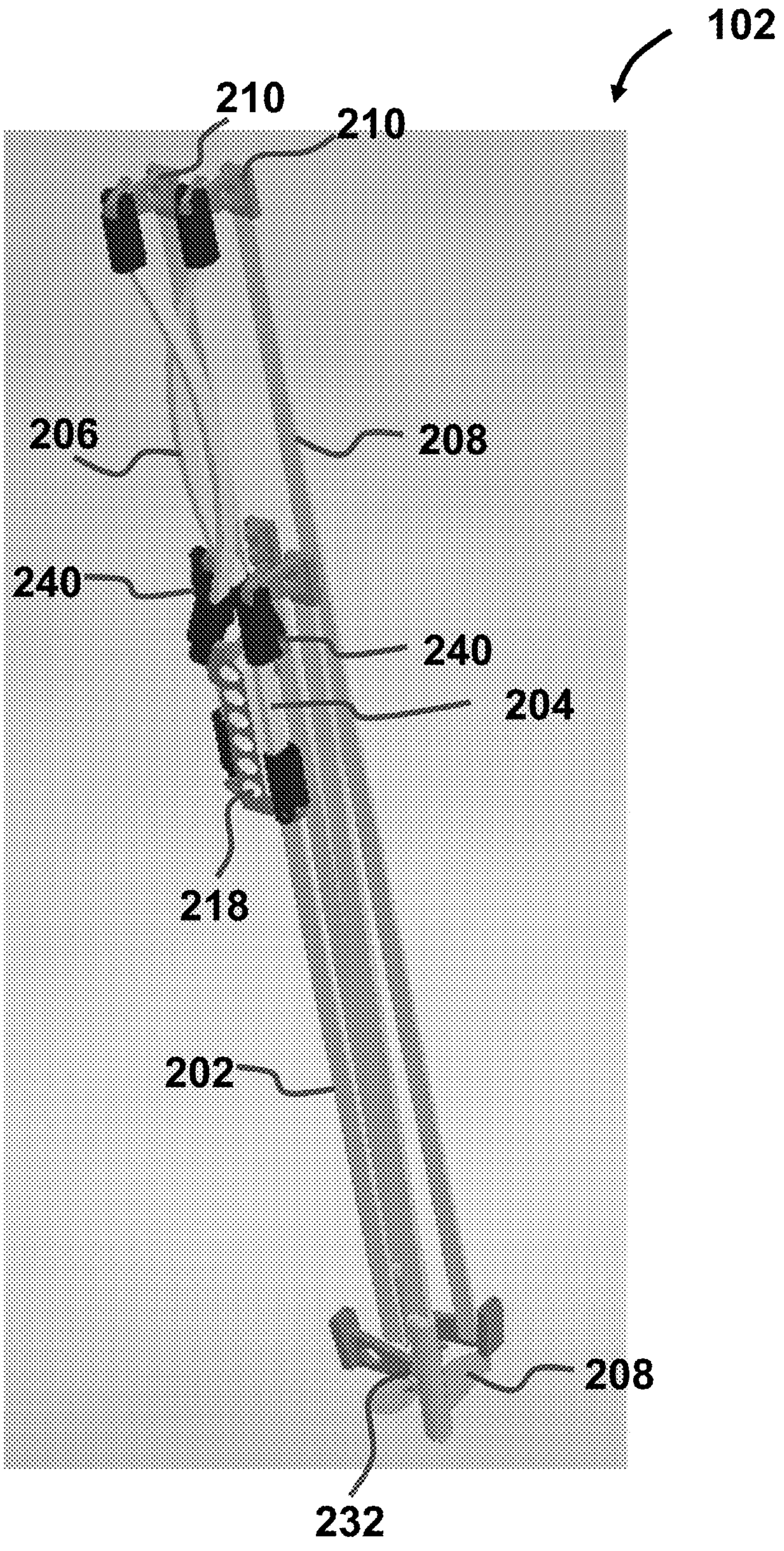
FIG. 12 illustrates a stowed frame, in accordance with embodiments of the disclosure.
Figure 14:
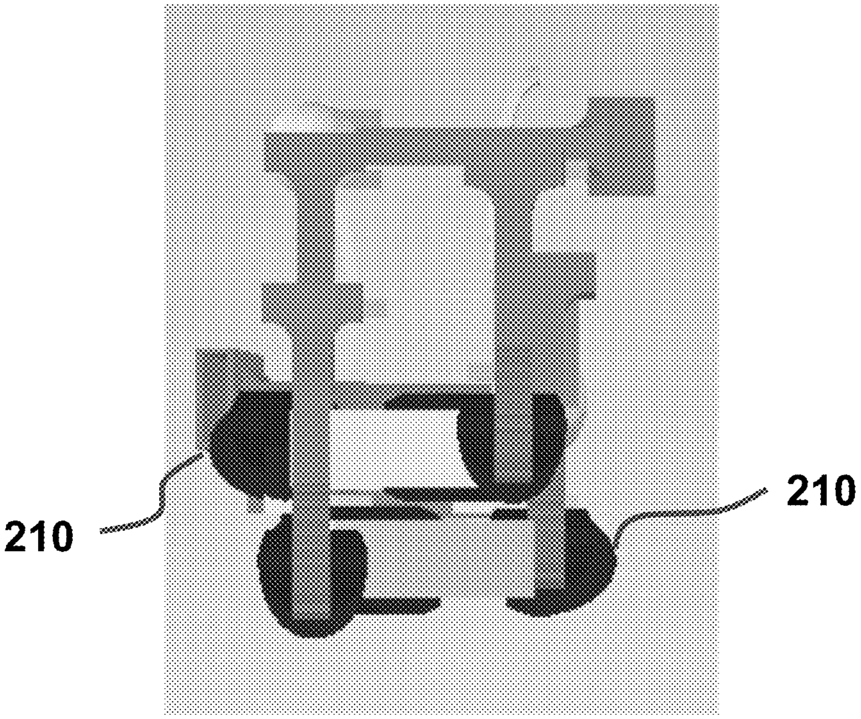
FIG. 14 illustrates a top view of a stowed frame, in accordance with embodiments of the disclosure.
Figure 15:
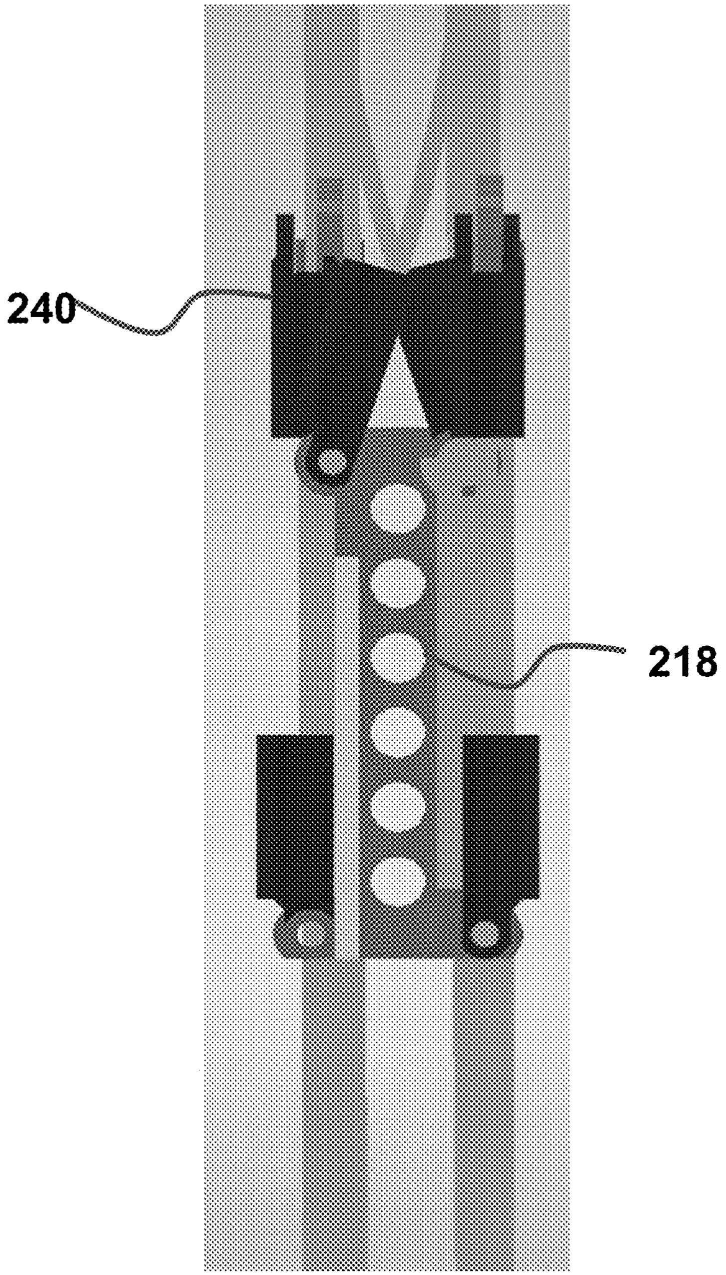
FIG. 15 illustrates a center point hinge assembly and portions of a frame, in accordance with embodiments of the disclosure.
Figure 16:
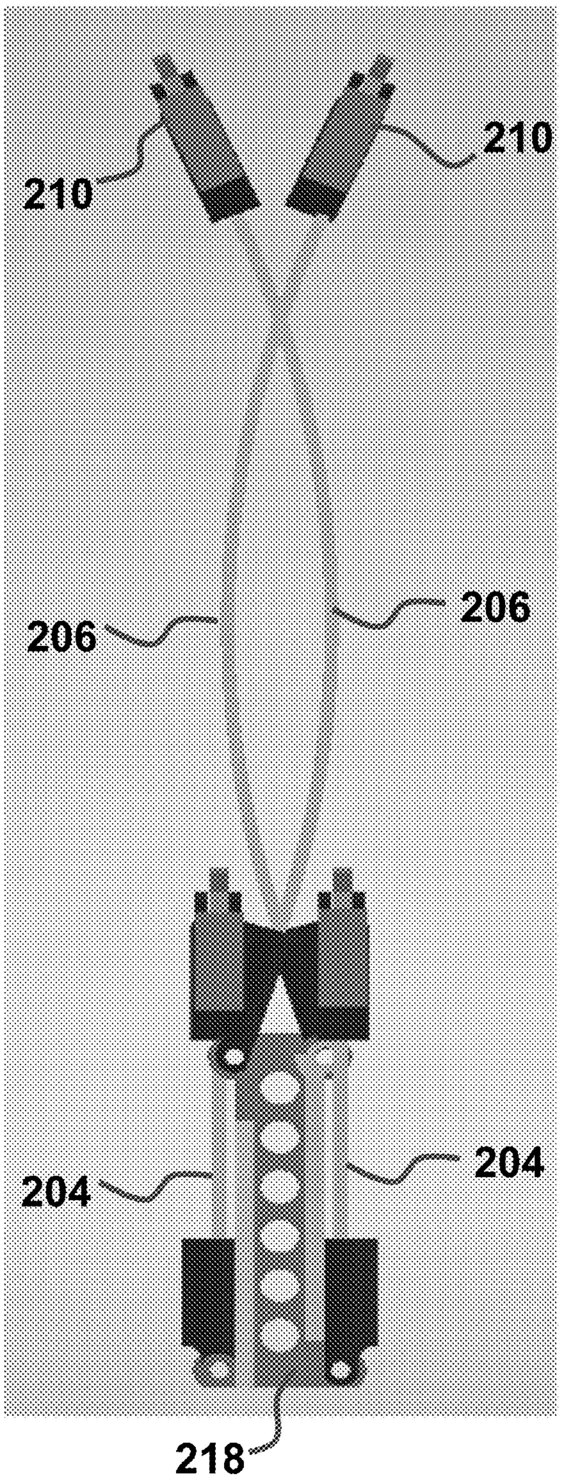
FIG. 16 illustrates a partially stowed frame, in accordance with embodiments of the disclosure.
Figure 17A:
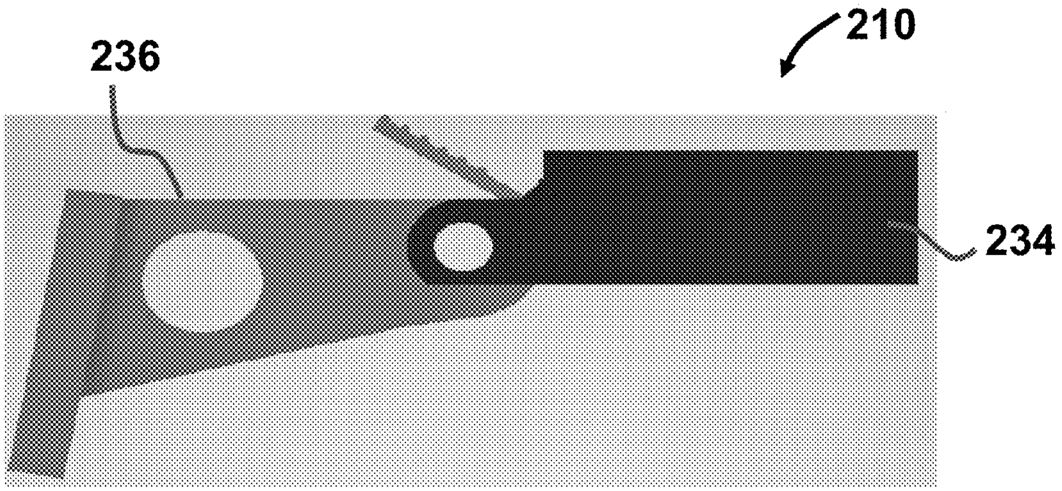
FIGS. 17A-C illustrate an upper hinge assembly and HOB hinge assembly, in accordance with embodiments of the disclosure.
Figure 17B:
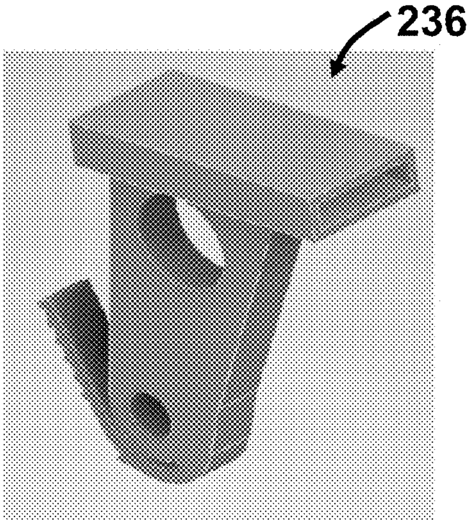
Figure 17C:
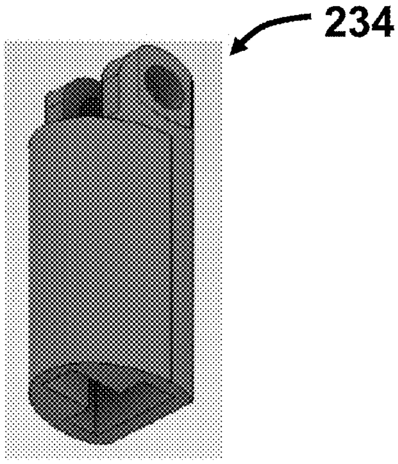

Upper arm 206 and arch beam 208 are connected to each other by an upper hinge assembly 210. Specifically, as shown in FIG. 8, an upper arm second end 214 is connected to an arch beam first end 216 by upper hinge assembly 210. As illustrated in FIG. 17, in some embodiments, upper hinge assembly 210 includes a female hinge 234 (FIG. 17C) and a 1⁄8 inch male hinge 236 (FIG. 17B), assembled together with a 1⁄4 inch diameter press fit screw. However, any suitable means for connecting female hinge 234 and male hinge 236 may be used. When deployed, upper hinge assembly 210 opens to 105° and gives structure to frame 102 to create the desired curvature of frame 102. When stowed, upper hinge assemblies 210 create the top of the collapsed frame 102, as illustrated in FIGS. 12 and 14.

Figure 18:
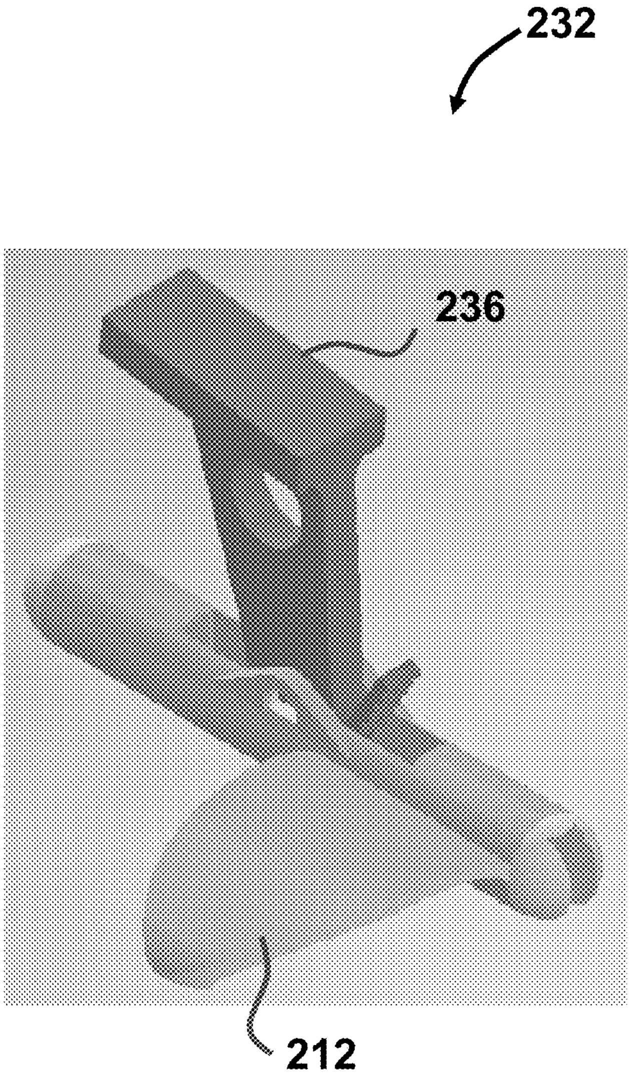
FIG. 18 illustrates a paddle hinge assembly, in accordance with embodiments of the disclosure.

Each long leg 202 includes a paddle 212 at the most distal end of frame 102. Paddles 212 are uniquely shaped to grip a surface on which apparatus 100 sits, e.g. a stretcher, gurney, bed, etc. As discussed in further detail below, although paddles 212 extend into the internal environment 118, they are covered by integrated pockets in cover 104 which protect portions of frame 102 from pathogens within the internal environment 118 while not interfering or creating pressuring points for the patient. Paddle 212 at long leg second end 228 attaches to arch beam second end 230 by a paddle hinge assembly 232. Paddle hinge assembly 232 is illustrated in greater detail at FIG. 18. Paddle hinge assembly 232 comprises paddle 212 and a 1⁄8 inch male hinge 236. Paddle hinge assemblies 232 accept 1⁄8 inch thick arch beams 208 and the 3⁄16 inch thick long legs 202. A press fit installation method allows the male hinge 236 to rotate, easily forming to the desired shape of frame 102 when deployed and collapsing when stowing frame 102. When stowed, paddle hinge assemblies 232 create the bottom of the collapsed frame 102.

Short leg second end 238 is connected to long leg 202 by a head of bed (HOB) hinge assembly 240. HOB hinge assembly 240 assumes the same configuration as upper hinge assembly, illustrated in FIG. 17. HOB hinge assembly 240 includes a female hinge 234 and a 3⁄16 inch male hinge 236. The HOB hinge assemblies 240 lay flat on the base of frame 102 and open to 105°, creating the tapered shape of frame 102 when deployed and locked. When stowed, the HOB hinge assemblies collapse and reduce the width of the stowed frame 102.

Figure 19A:
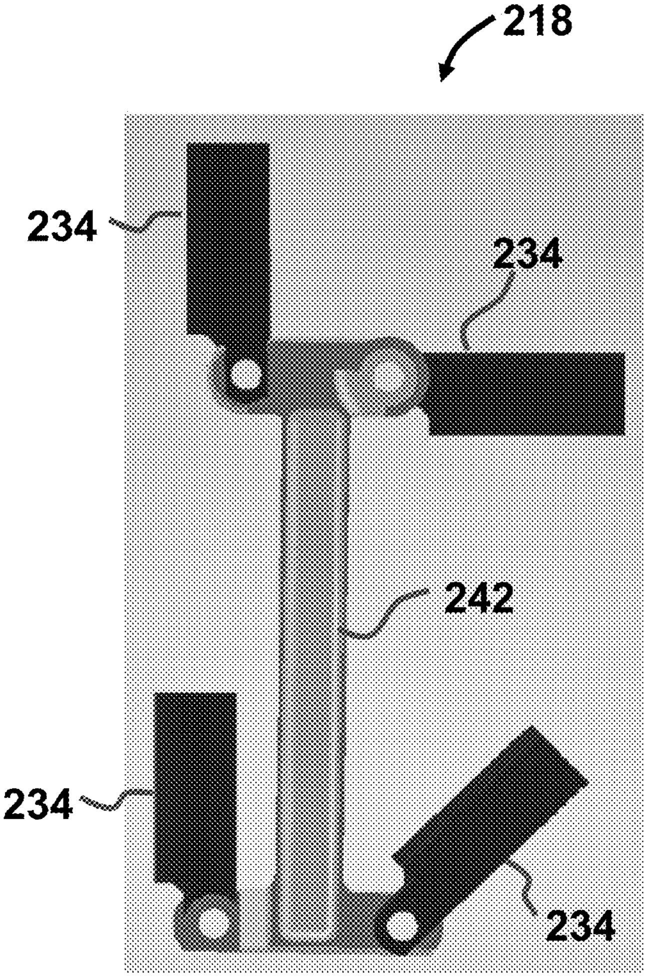
FIGS. 19A-B illustrate a center point hinge assembly, in accordance with embodiments of the disclosure.
Figure 19B:
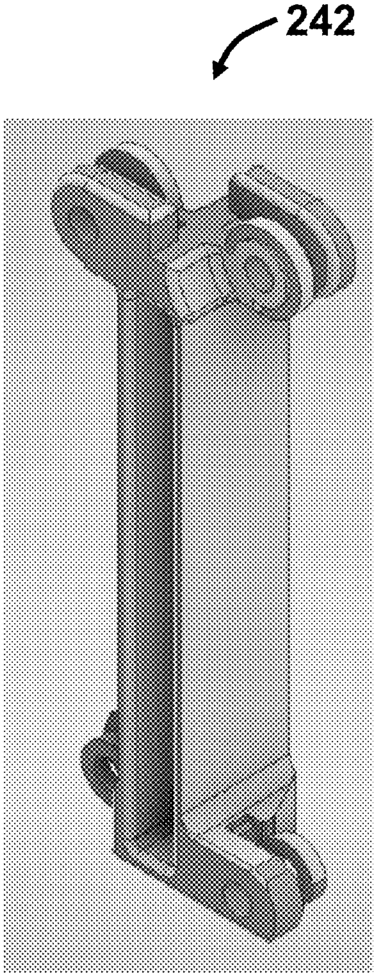

Upper arms 206 and short legs 204 are connected to a center point hinge assembly 218. Specifically, an upper arm first end 220 is connected to center point hinge assembly second end 244, and short leg first end 222 is connected to center point hinge assembly first end 224. Center point hinge assembly 218 is illustrated in greater detail at FIG. 19.

Center point hinge assembly 218 provides a central axis for deployment and stowing of frame 102, such that when stowed, upper arms 206, short legs 204, long legs 202, and arch beams 208 align parallel to the central point hinge assembly. When fully assembled, frame 102 can rest in its deployed state with or without cover 104 installed onto it. This is due to the ability of the hinges to intuitively lock in place during deployment. Center point hinge assembly includes center point 242 and four female hinges 234. Center point hinge assembly 218 resides at the base of frame 102 at the HOB when deployed. With four female hinges 234 installed at its four corners, this assembly has the most installed components. Each female hinge 234 resides in a different plane on center point 242, allowing the curved frame components to fold when stowing frame 102 without interfering with each other. Center point 242 also utilizes a similar locking mechanism as male hinge 236, creating a mechanical locking mechanism which must be released via gentle pressure by users/health care providers to unlock and collapse frame 102.

In some embodiments, apparatus 100 also includes strapping sites located on the proximal and distal portions of the frame 102. These straps may aid in securing apparatus 100 to the bed (stretcher/gurney/litter/air-medical bed) on which the patient rests. These straps may consist of clips, buckles, velcro, fasteners, etc.

Figure 20:
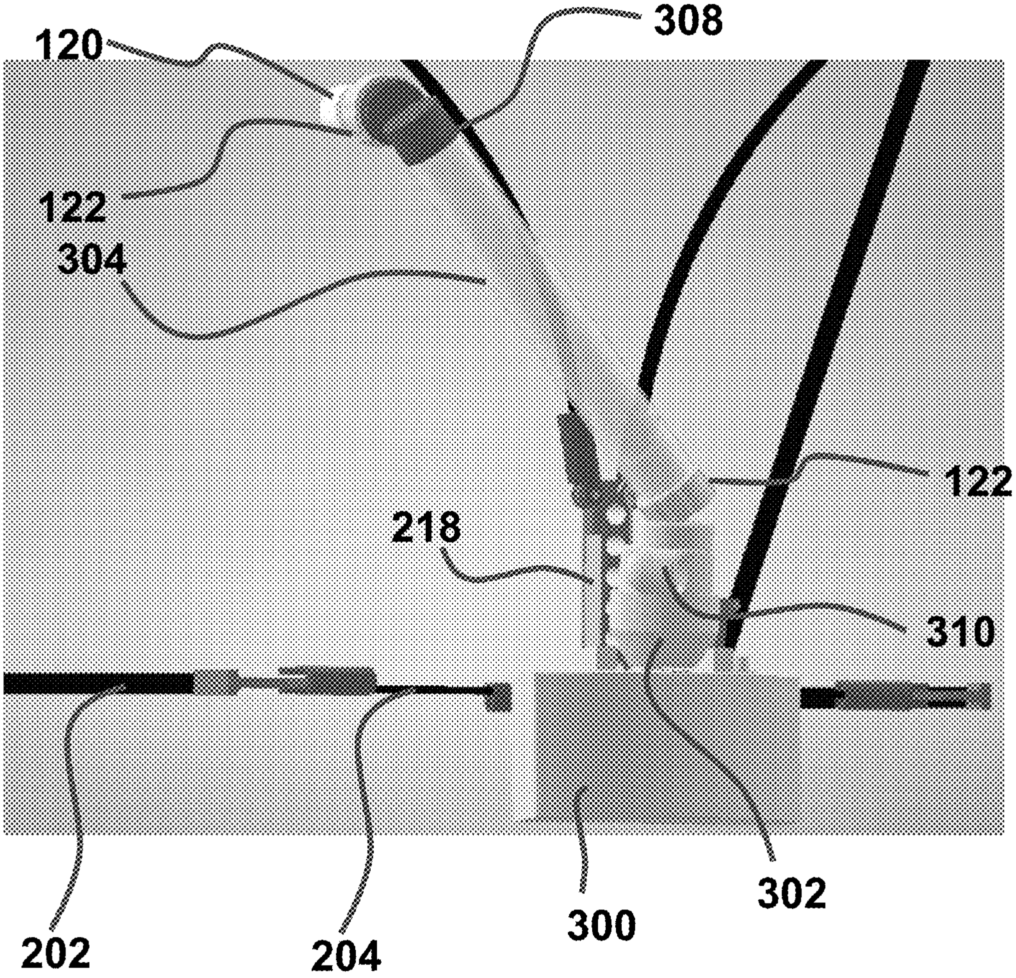
FIG. 20 illustrates a portion of a frame including a battery pack and blower unit, in accordance with embodiments of the disclosure.

In some embodiments, center point hinge assembly 218 also provides a point of attachment for a battery pack 300 and blower unit 302, as illustrated in FIG. 20. Battery pack 300 and blower unit 302 may be attached to center point hinge assembly 218 in any suitable orientation. Blower unit 302 is used to introduce unidirectional airflow from the base of apparatus 100 to the bacterial/viral inline filter 126 within cover 104, and eventually exhaust the air out of the internal environment 118 to the external environment. The filter 126 is installed within the internal environment 118 of cover 104 as a flush press-fit within the I.D. tube 120 on cover 104. This configuration ensures a tight fit and that the filter cannot be disengaged by the patient from inside the cover 104. In some embodiments, the filter 126 is a HEPA filter that allows for air circulation and assists with limiting condensation, while further protecting clinical workspace and transport environments. As cover 104 is decompressed during stowage of apparatus 100 (described below), contaminated air is directed through bavterial/HEPA filter further mitigating exposure and allowing for easy disposal of cover 104.

In some embodiments, a 40 mm female connector 122 is installed on the external environment of cover 104 as a flush press-fit with a clamp to secure, sharing the other end of the 2-inch long by 1.25-inch O.D., 1-inch I.D. tube 120 on cover 104. This ensures all air exiting the exhaust port of blower unit 302 is filtered through filter 126 first. Installed on blower unit 302 is an inlet hose 304 for connecting blower unit 302 to cover 104. The inlet hose 304 includes the 40 mm female connector 122 on one end for installation into blower unit 302, while the other end utilizes a 90° male fitting 308 for installation into cover 104. Installation into cover 104 is done by threading the 90° male fitting 308 into the installed 40 mm female connector 122 installed in the I.D. tube 120 on the cover 104. Therefore, airflow moves through each component in the following order: base of internal shell within internal environment 118, through filter 126 in internal environment 118, through the 90° male fitting 308, through 40 mm female connector 122 in the external environment, through inlet hose 304, through the 40 mm female connector on the inlet hose 304, through blower unit 302, and exhausted via a blower exhaust port 310 on blower unit 302. The 40 mm connector 122 is threaded, is an industry standard, utilizing a specific knuckle thread proven to be both gas and liquid tight. The blower system shall be used throughout the duration that the apparatus 100 is in use with a patient.

The blower unit 302 is powered via an external battery source 300. In some embodiments, blower unit 302, battery source 300, and an ITT wire connector (not shown) are acquired as a single system and are installed onto PPE apparatus 100 prior to use. When apparatus 100 is stowed, blower unit 302, battery pack 300, ITT wire connector, and inlet hose 304 are not installed on apparatus 100. When apparatus 100 is deployed, blower unit 302 and battery pack 300 are attached to frame 102 at head assembly 108. In some embodiments, blower unit 302 is attached to center point hinge assembly 218. In preferred embodiments, blower unit 302 is installed onto apparatus 100 prior to donning apparatus 100 onto a patient. In preferred embodiments, airflow is introduced into apparatus 100 prior to donning apparatus 100 onto a patient.

In preferred embodiments, blower unit 302 operates at a minimum of 4 cubic feet of air moved per minute (CFM), the industry standard for airflow in portable battery powered respirator (PAPR) systems. In preferred embodiments, airflow in the apparatus 100 results in at least 12-14 air exchanges per hour (AEPH), in compliance with current OSHA standards. Utilization of blower unit 302 ensures safety to the patient by introducing directional airflow into PPE apparatus 100, and inducing a negative pressure environment. By meeting common industry standards, the internal environment 118 is safe for the patient while mitigating the potential for cross-contamination between environments. Together, these mitigation mechanisms act to filter all exhausted air out of apparatus 100, also keeping health care professionals safe during use.

In some embodiments, more than one blower unit 302 is used. One blower unit 302 may be positioned to provide airflow across filter 126 in order to help reduce thermal stress to patients within/under apparatus 100. A second blower unit 302 may be attached to frame 102 and/or cover 104 to help evacuate contaminated air within the tent through a HEPA or bacterial-viral inline filter to safely evacuate air and create a negative flow environment without accessory requirements such as medical air or a filtered suction. If one blower unit 302 fails, the other may be programmed to automatically stop such that a positive pressure environment does not build, which could result in potentially expelling contaminated air out of apparatus 100.

The use of blower unit 302 to create a negative flow environment help to keep the patient environment more stable during transport in a wider variety of environmental conditions and temperatures. For example, cover 104 may include a filter material in the internal environment 118 extending across a top portion of cover 104 to form a sub-compartment. One of the blower units 302 may be configured to deliver the cooling air to the main chamber below the sub-compartment while the other blower unit 302 creates the negative flow environment within cover 104 by expelling air from the sub-compartment, thus causing air to be drawn through the separating filter material from the main chamber to the sub-compartment.

Figure 13:
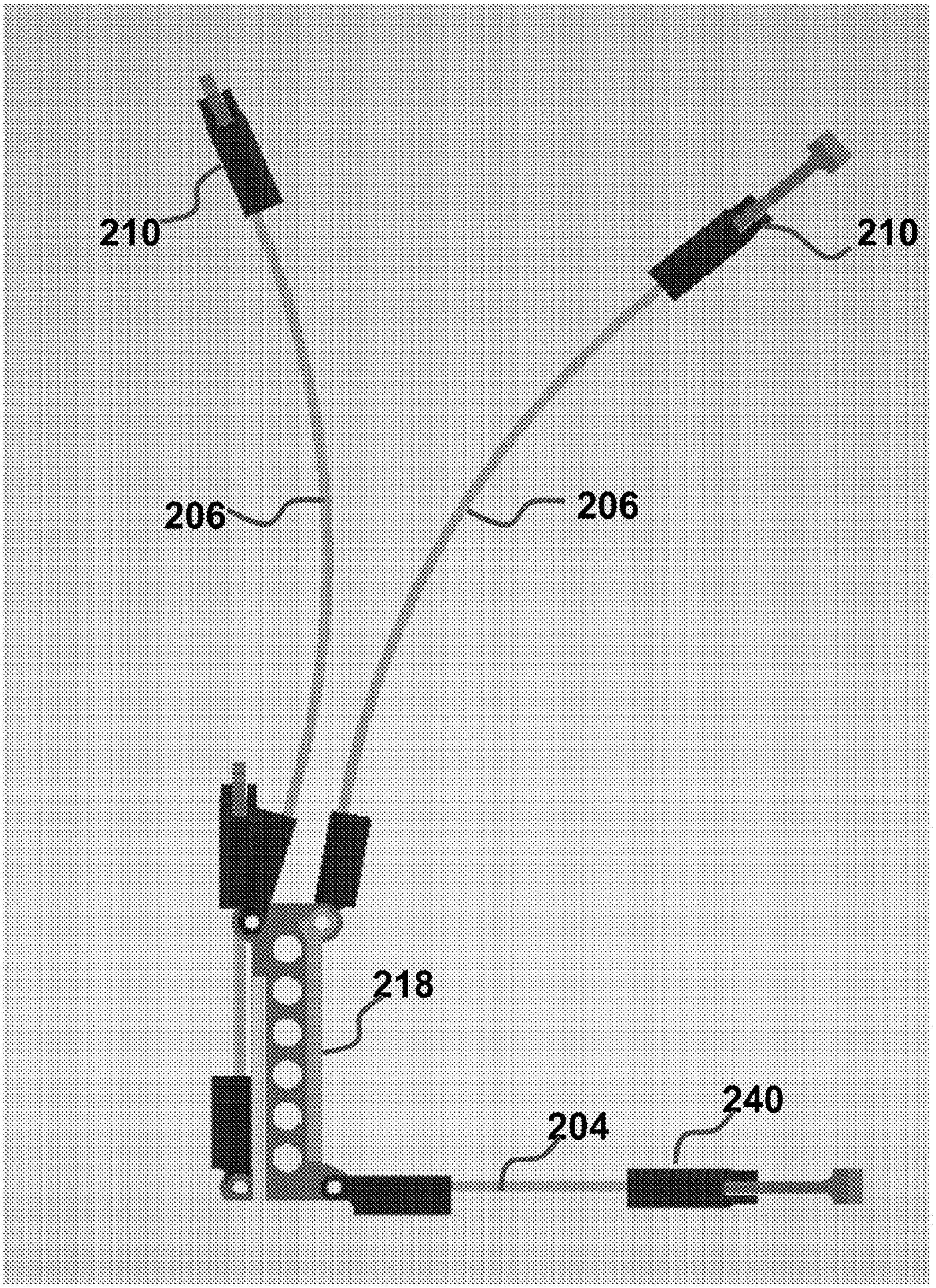
FIG. 13 illustrates a partially deployed frame, in accordance with embodiments of the disclosure.

A stowed position of apparatus 100 is illustrated in FIGS. 12 and 14. In order to deploy apparatus 100 from the stowed position, a user may grip the lower short legs 204, with the upper hinge assemblies 210 held upwards and arch beams 208 facing away from the user. The short legs 204 are then rotated from vertical to horizontal from the center point hinge assembly 218, as shown in FIG. 13. This causes upper arms 206 to turn outwards, and also raises the paddle hinge assembly 232 outwards away from the user.

Figure 11:
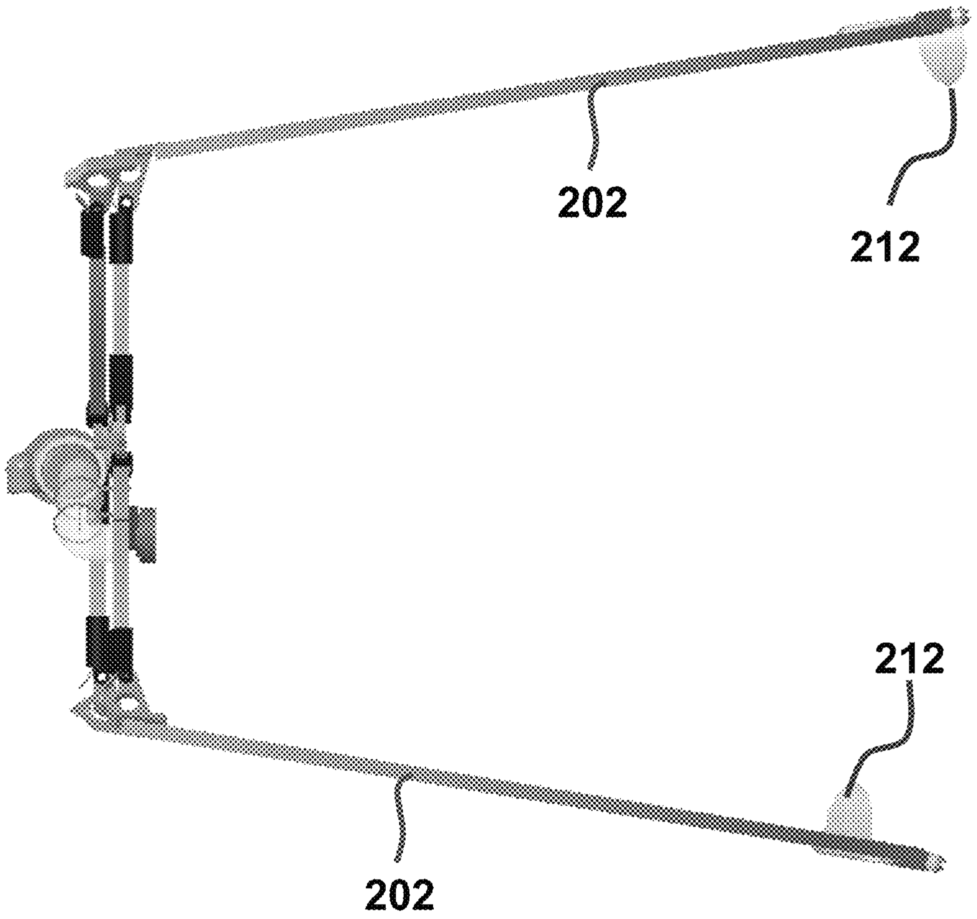

The combination of hinge rotation axis and flexible fiberglass elements link the intermediate positions between deployed and stowed positions of short legs 204, and the deployed and stowed position of long legs 202 and arch beams 208. The user may then fully lock the HOB hinge assemblies 240 in place. This creates the U shape of the frame 102, as illustrated in FIG. 11, for example. The user may then grip frame 102 on upper hinge assemblies 210 in order to lock upper hinge assemblies 210. This action locks the shape of the frame 102 in place.

The stowage sequence of PPE apparatus 100 is similar to the deployment sequence, but in reverse. From a fully deployed and locked position the user grips the two upper hinge assemblies 210, one with each hand. The user may then unlock both upper hinge assemblies 210, allowing the arch beams 208 to straighten slightly. The user may then grip both HOB hinge assemblies 240. The user may then unlock the HOB hinge assemblies 240 which allows long legs 202 to move inwards. The user may then rotate the HOB hinge assemblies 240 towards the center point hinge assembly This action causes arch beams 208 to drive the paddle hinge assemblies 232 down and upper hinge assemblies 210 up, effectively drawing arch beams 208, upper arms 206, short legs 204, and long legs 202 in, to compress and align in parallel with center point hinge assembly 218. Frame 102 may then be slightly compressed into a storage compartment. In preferred embodiments, frame 102 is lightweight and packed down to a small size for ease in carrying and stowing apparatus 100 in a wide variety of environments. Frame 102 may be easily decontaminated by wiping it down with oxivir wipes or other approved decontamination wipes.

The hinge assembly components 210, 218, and 240 interact to create a locking mechanism, to hold frame 102 in the deployed state. The locking mechanism automatically engages when the hinges are fully opened. The locking mechanism can be dis-engaged with one hand, for each hinge, allowing frame 102 to be stowed quickly and easily. When deployed, all hinges are open to their deployed state. As discussed above, HOB hinge assemblies 240 and upper hinge assemblies 210 may open to 105°. The center point hinge assembly 218 allows the female hinges to open to 90° on the base, and 60° on the upper portions of the apparatus 100. The paddle hinge assemblies 232 may open to 75° for the male hinge. All hinge assemblies will not collapse until dis-engaged by the user.

When stowed, all hinge assemblies collapse to 0°, laying in line with each other allowing the frame 102 to be oriented in its stowed position. Switching from the stowed to deployed state is done by engaging each hinge assembly until they are locked, pushing the frame components out to their desired state.

In order to secure cover 104 to frame 102 in its stowed position, a user may slide the collapsed sides of frame 102 (with arch beams 208 folded in parallel to the long leg 202) into the double walled sleeve formed by the inner and outer panels of the side panel assemblies 112 of cover 104. Paddle hinge assemblies 232 may be installed into integrated pockets for the paddle hinge assemblies 232 in the inner panel of the side panel assemblies 112 by sliding paddle hinge assembly 232 into these pockets. The angle of the pockets guides the paddle hinge assemblies 232 into the correct position. The user may then pull the cover back toward each hinge assembly at the most proximal location of the frame 102. The user may then wrap straps on the cover 104 around each upper hinge assembly 210 to secure the cover 104 to the frame 102. In some embodiments, a section of the transparent engineered polymer material includes preinstalled fasteners (hooks) on head assembly 108, which may be wrapped around the two short legs 204 of frame 102. At the short legs 204, another section of fasteners (loops) meet the hooks and secure the base of head assembly 108 to the base of frame 102. The apparatus 100 is then in its assembled state for storage, and ready to deploy. Deployment of frame 102 with cover 104 installed is identical to deployment of the frame without cover 104 installed.

In some embodiments, in order to secure a new cover 104 to frame 102 during deployment of apparatus 100, each paddle hinge assembly 232 is inserted into its respective pocket in side panel assembly 112. Paddle hinge assemblies 232 are installed into their paddle pockets, after which the top corners of the side panel assembly 112 and head assembly 108 are pulled over the upper hinge assemblies 210 of frame 102. Once the hinges at each upper corner are locked into place, and both the left and right arch beams 208 are deployed, fastener may then be used to secure the top panel assembly 106 to side panel assemblies 112 using matching fastener on an upper portion of side panel assemblies 112. The fastener at these points assists in wrapping cover 104 around the two upper hinge assemblies 210. Once the upper corners of cover 104 are secured to frame 102, the base of the head assembly 108 may be secured to frame 102. This may be completed by wrapping fastener panels on the head assembly 108 around the short legs 204 of frame 102 and securing them onto the head assembly 108. After all fastener attachment points are secured around frame 102, cover 104 is fully installed onto frame 102 and ready for blower unit 302 installation. In preferred embodiments, cover 104 completely isolates frame 102 during use, allowing frame 102 to be reused, while each cover 104 having an installed filter 126 is single use.

The cover 104 may be stowed while installed onto frame 102, or stored as a stand-alone cover 104, ready to be secured to frame 102 when needed. When cover 104 is stowed with frame 102, cover 104 is secured on frame 102 as it is when deployed. In some embodiments, as frame 102 collapses into its stowed position, the flexibility of both the orange and transparent engineered polymer materials allow cover 104 to follow its stowing motions. When cover 104 is stowed without frame 102, cover 104 is folded and rolled into a low-profile component. From there, cover 104 can be unfurled and easily installed onto a frame 102 when needed. In preferred embodiments, frame 102 may be set up and have a cover 104 installed on it in less than one minute, prior to placing apparatus 100 over a patient. In preferred embodiments, all structural element materials on the frame and shell do not include metal components that would interfere with use in high magnetic zones such as magnetic resonance imaging (MRI) suites or with imaging in computed tomography (CT) scans.

The steps of donning a patient are as follows:

Note: positions of frame 102 are described as proximal or distal to the center point hinge assembly 218 at the head of the apparatus 100 which correlates to the head of the bed when the device is in place over the patient.

Step 1: Remove fully assembled EMS-PROTECT unit/apparatus 100 (disposable cover 104 attached to reusable frame 102) from storage (e.g. storage tubing or other storage mechanism).

Step 2: Fully expand apparatus 100 and allow hinges to lock into place.

Step 3: With patient on a transport bed (stretcher/gurney/litter/air-medical bed), position fully expanded apparatus 100 over the patient at the head of the bed.

Step 4: Gently slide base mat assembly 110 under the head of the patient (between the patient head and surface of the bed) until the center point hinge assembly 218 and extending short legs 204 of the frame come to rest at the head of the bed (stretcher/gurney/litter/air-medical bed).

Step 5: As the base mat assembly 110 is slid into position at the head of the bed, guide paddles 212 and the distal base mat assembly 110 into position under the patient and atop the surface of the bed (stretcher/gurney/litter/air-medical bed). Depending on the patient size, the paddles 212 may slip under the arms/torso of the patient and rest on the surface of the bed, or paddles 212 may come to rest on the top surface of the bed mattress if the patient is small, e.g. a child or infant, helping to further stabilize apparatus 100.

Step 6: Secure apparatus 100 to the bed (stretcher/gurney/litter/air-medical bed) using adjustable straps located at head assembly 108 of apparatus 100 along short legs 204, and lateral strapping sites located on the proximal and distal margins (near the paddle hinge assemblies) of long legs 202 of frame 102. The straps are highly adjustable to accommodate a wide variety of patient transport bed configurations.

Step 7: Secure elasticized strapping over the functional draping/patient blanket assembly 114 at the distal end of apparatus 100 where the patient torso exits top panel assembly 106 of cover 104 to be snug over the patient.

Step 8: Attach battery pack 300 and blower unit 302 to the center point hinge assembly 218.

Step 9: Attach inlet hose 304 to filter 126 integrated into the cover 104 at the head of the bed.

Step 10: Secure inlet hose 304 to cover 104 using integrated clips.

Step 11: Turn blower unit 302 on.

The steps of patient doffing are as follows:

Note: This process is ideally performed in controlled environments where all providers/users are in appropriate PPE. This process is best performed with two users.

Step 1: Release secured straps at distal, lateral and proximal sites of apparatus 100.

Step 2. Release elasticized functional draping/patient blanket assembly 118 strapping.

Step 3: User 1 to gently lift EMS-PROTECT/apparatus 100 up off and away from the patient while user 2 folds the patient blanket assembly 114 to meet the base mat assembly 110. As user 1 lifts the device up from the patient, user 2 folds the patient blanket assembly 114 underneath the apparatus 100 and secures it using fastener seal points under base mat assembly 110, and proceeds to move the apparatus 100 to nearby doffing station (floor or table).

Step 4: Unsecure fastener attachment points to release cover 104 from frame 102.

Step 5: Turn blower unit 302 off, and remove inlet hose 304 from integrated filter 126, unclip secured hosing and unclip battery pack 300 from center point hinge assembly 218. The battery pack 300, inlet hose 304 and blower unit 302 should now be separated from frame 102 and cover 104, and set aside for decontamination.

Step 6: Unlock hinge assemblies of frame 102.

Step 7: Simultaneously collapse frame 102 while removing paddles 212 from the pockets and removing frame 102 from cover 104 side panel assemblies 112. The frame 102 should now be separate from the cover 104, and set aside for decontamination.

Step 8: Gently roll cover 104 toward the direction of integrated filter 126, expelling air through the filter 126.

Step 9: Discard the used cover 104 in an appropriate biohazard disposal vessel.

The steps of emergent doffing are as follows:

Step 1: Release secured straps at distal, lateral and proximal sites of apparatus 100.

Step 2: Release elasticized strapping over patient torso.

Step 3: Lift apparatus 100 up and away from patient allowing immediate access to the patient.

Follow steps 4-9 above to dispose of cover 104 and decontaminate battery pack 300, blower unit 302 and frame 102.

Example 1

A PPE apparatus 100 was produced according to the configurations and designs described above. The dimensions of the apparatus 100 and materials used are described below.

When stowed, the frame 102 had a 4 inch diameter, measuring 33 inches long. When deployed, the frame 102 had dimensions:

Head of bed width: 19"

Head of bed height: 19"

Paddle to Paddle width when deployed: 22"

Frame Length: 26"

Dimensions of components of the frame were:

Short Leg: 6.5"L×½"W×3⁄16"H

Long Leg: 26"L×½"W×3⁄16"H

Upper Arm: 12" End to End. Curve is offset by 2". 3⁄16" Thick Acrylic, ½" Width.

Arch Beam: 33"L×½"W×¼"H

The apparatus 100 could be set up and operational in less than one minute.

When stowed onto a frame, due to the flexible nature of cover 104, the cover 104 followed the dimensions of the collapsed frame 102. With a 4 inch diameter measuring 33 inches long, the cover 104 did not infringe on the stowed dimensions of the frame 102.

When stowing a cover 104 separate from the frame 102, the profile of the cover 104 was dramatically reduced. Cover 104 could be stowed with a 3 inch diameter measuring 19 inches long.

When deployed, cover 104 followed the dimensions of the frame 102. A height of 19" and a maximum width of 22" followed the frame 102 exactly. The length of the cover 104 measured 56" from the end of the patient blanket assembly 114 to the head assembly 108. The apparatus 100 includes an orange base mat assembly 110 measuring 26" L×22" W at its maximum, running from the end of the paddle pockets to head assembly 108. These dimensions were chosen based on stretcher/litter dimensions.

Cover 104 was made with a 6 mil engineered polymer material. This transparent material made up a majority of the cover 104. The head assembly 108, patient blanket assembly 114, top panel assembly 106, side panel assemblies 112, and glove ports 116 were all created out of this engineered polymer.

A yellow 20 mil engineered polymer material was used to create the paddle pockets. This transparent thicker material was used to improve durability, while its yellow color helped identify a key component used to install the frame 102.

The most durable material on the cover 104 was the orange engineered polymer material, which was used to create the base mat assembly 110. Its color helped add orientation to an otherwise clear tent. The orange base mat assembly employed a cross-stitch to improve durability and abrasion resistance.

The PPE apparatus 100 was produced using an RF welding manufacturing techniques, which prevented exposure of the frame 102 to the internal environment of the cover 104 and allowed for reuse of the frame 102 after decontamination, while only needing to discard the covers 104 following each use.

Elasticized velcro strapping on the patient blanket assembly 114 gave flexibility in the size of patients the apparatus 100 can be used with, and provided the ability to be adjusted accordingly to form the flexible patient blanket assembly 114 with minimal opening. Since both the strapping and the patient blanket assembly 114 were flexible, these minimal but expandable openings could be used as pass-through ports when needed.

Each cover 104 had an integrated bacterial/viral inline filter 126, with a 40 mm female connector 122 on its external side for blower unit 302 installation. The placement of the filter 126 and connector together ensured all exhausted air through the blower unit 302 had been filtered to 99.97% efficiency.

When deployed, the outer panel of the side panel assemblies 112 were cut such that the long legs 202 of the frame 102 were exposed to the external environment only. This allows strapping to wrap around the frame 102 and help secure the apparatus 100 to the stretcher/gurney/litter. Similarly, the head assembly 108 exposes the short legs 204 of the frame 102 to allowed for strapping access.

Visibility was maximized by the material choices of the cover 104. Offering 100% visibility when deployed, patient monitoring was not impeded.

The four glove locations also allowed patient intervention when desired. Due to their unique locations on the tent and their length (19" in total), health care providers could have access to 100% of the internal environment when utilizing the glove ports 116.

Dimensions of the hinge components were as follows:

Male Hinge, ¼" thick fiberglass acceptor: 2.40"L×0.64"W×1.90"H

Male Hinge, 3/16" thick fiberglass acceptor: 2.40"L×0.67"W×1.9"H

Female Hinge: 2.25"L×0.7"W×0.7"H

Paddle Hinge: 4.1"L×2.4"×0.75"H

Center Point Hinge: 2.3"L×0.99"W×5.35"H

In the stowed position of apparatus 100, dimensions of the hinge assemblies were as follows:

HOB Hinge Assembly: 2.35"L×2.75"W×0.7"H

Upper Hinge Assembly: 2.35"L×2.75"W×0.7"H

Paddle Hinge Assembly: 4"L×2.4"W×2.35" H

Center Point Hinge Assembly: 2.56"L×1.16"W×7.35"H

In the deployed position of apparatus 100, dimensions of the hinge assemblies were as follows:

HOB Hinge Assembly: 4.13"L×0.64"W×0.7"H

Upper Hinge Assembly: 4.13"L×0.64"W×0.7"H

Paddle Hinge Assembly: 4"L×2.4"W×2.7" H

Center Point Hinge Assembly: 2.69"L×1.685"W×7"H

Hinges of apparatus 100 were 3D printed with ABS or PLA or polymer filaments.

Blower unit 302 used for the apparatus 100 were the following dimensions:

When stowed and deployed, the nominal dimensions of the blower was 2.8"L×2.8"W×3.5"H, while the inlet hose was 14"L×3.15"W×1.55"H. The battery pack measured 6.75"L×2.77"W×4.125"H and the ITT wire connector measured 48.5"L×0.9"W×0.9"H. The blower, external battery source, ITT wire connector, and inlet hose were stowed separately from the rest of the unit prior to use.

The blower unit 302 used was comprised of a noryl 731 (plastic) casing. The battery pack 300 included a plastic case and a NiCAD (nickel cadmium) battery. The ITT Wire Connector included a rubber casing and plastic connectors.

The blower unit 302 and filter 126 were tested and produced 66 air exchanges per hour (AEPH). This exceeds the CDC recommended air exchanges of 12-14 AEPH by five-fold.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A patient-based personal protective equipment apparatus, the apparatus comprising:

a collapsible frame; and a cover detachably coupled to the frame;

wherein the collapsible frame is configured to support the cover, wherein the cover is configured to provide an internal environment surrounding a head and a torso of a patient, and to mitigate the spread of an airborne pathogen from the patient to an external environment surrounding the apparatus;

wherein the cover comprises a head assembly configured to be positioned proximal to the patient's head, two side panel assemblies configured to be positioned on each side of the patient, a top panel assembly configured to be positioned above the patient, and a base mat assembly configured to be positioned beneath the patient;

wherein the frame comprises:

a center point hinge assembly:

two first legs extending laterally from the center point hinge assembly;

two second legs, wherein each second leg is connected to one of the two first legs by a head-of-bed ("HOB") assembly;

two upper arms, extending vertically from the central point hinge assembly;

two arch beams, wherein each arch beam is connected to one of the two upper arms by an upper hinge assembly, wherein each second leg connected to one of the two arch beams by a paddle hinge assembly, and wherein each paddle hinge assembly comprises a paddle configured to grip a surface on which the apparatus sits, wherein the cover comprises a filter;

the apparatus further comprising a blower unit and an inlet hose coupled to the blower unit and the filter, wherein the blower unit is configured to evacuate air contaminated with the pathogen within the cover, through the filter, through the hose, and out of the internal environment;

the apparatus further comprising a second blower unit configured to provide airflow into the internal environment.

2. The apparatus of claim 1, wherein a portion of the cover is transparent.

3. The apparatus of claim 1, wherein the apparatus is portable.

4. The apparatus of claim 1, wherein the cover comprises one or more glove ports configured to allow a user to access the internal environment.

5. The apparatus of claim 4, wherein the cover comprises four glove ports, wherein one glove port is located on each of the two side panel assemblies, and two glove ports are located on the head assembly.

6. The apparatus of claim 1, wherein the top panel assembly further comprises a patient blanket assembly, configured to drape the patient distal to the patient's head and torso.

7. The apparatus of claim 6, wherein the patient blanket assembly comprises one or more straps for securing the patient blanket assembly to the patient, wherein the patient blanket assembly is configured to further mitigate the spread of the airborne pathogen from the patient to the external environment.

8. The apparatus of claim 1, wherein the cover comprises a flexible, plastic material.

9. The apparatus of claim 1, wherein the central point hinge assembly, each HOB assembly, each paddle hinge assembly, and each upper hinge assembly, are configured to lock the apparatus in a deployed position and collapse the apparatus in a stowed position.

10. The apparatus of claim 1, wherein the cover is disposable after a single use.

11. The apparatus of claim 1, wherein the frame is reusable.

12. The apparatus of claim 1, wherein the blower unit and the filter are configured to produce at least 12 air exchanges per hour.

13. The apparatus of claim 1, wherein the blower unit is operated by a battery.

14. The apparatus of claim 1, wherein all components of the apparatus are computed tomography ("CT") and magnetic resonance imaging ("MRI") compatible.

15. The apparatus of claim 1, wherein the base mat assembly is configured to stabilize the apparatus on the surface.

* * * * *